(12) United States Patent
Hazeyama

(10) Patent No.: US 8,890,445 B2
(45) Date of Patent: Nov. 18, 2014

(54) DRIVE CONTROL DEVICE AND DRIVE CONTROL METHOD

(75) Inventor: Tomoaki Hazeyama, Yokkaichi (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 849 days.

(21) Appl. No.: 13/016,115

(22) Filed: Jan. 28, 2011

(65) Prior Publication Data

US 2011/0188100 A1    Aug. 4, 2011

(30) Foreign Application Priority Data

Jan. 29, 2010   (JP) ................................. 2010-019041

(51) Int. Cl.
*H02P 1/54* (2006.01)
*H04N 1/04* (2006.01)

(52) U.S. Cl.
CPC ....................................... *H04N 1/04* (2013.01)
USPC .......................................................... 318/34

(58) Field of Classification Search
None
See application file for complete search history.

(56) References Cited

U.S. PATENT DOCUMENTS

| 6,812,667 B2* | 11/2004 | Yasohara et al. ............... 318/599 |
| 2003/0184002 A1 | 10/2003 | Akiyama et al. |
| 2007/0024665 A1 | 2/2007 | Igarashi et al. |
| 2007/0075664 A1* | 4/2007 | Muroi .......................... 318/270 |
| 2009/0057997 A1* | 3/2009 | Hatada et al. ................. 271/270 |
| 2009/0190129 A1* | 7/2009 | Yguerabide et al. .......... 356/338 |
| 2010/0114518 A1* | 5/2010 | Lindberg et al. ................ 702/94 |
| 2010/0220982 A1* | 9/2010 | Maeda .......................... 388/811 |
| 2010/0277537 A1* | 11/2010 | Maekawara et al. ............ 347/16 |
| 2011/0018926 A1* | 1/2011 | Sasaki et al. .................... 347/16 |
| 2012/0138781 A1* | 6/2012 | Rai .......................... 250/231.13 |

FOREIGN PATENT DOCUMENTS

| JP | 2001-232882 | 8/2001 |
| JP | 2003-291433 | 10/2003 |
| JP | 2005-098735 | 4/2005 |
| JP | 2005-127761 | 5/2005 |
| JP | 2007-031125 | 2/2007 |
| JP | 2007-181379 | 7/2007 |
| JP | 2008-040779 | 2/2008 |
| JP | 2009-073181 | 4/2009 |

* cited by examiner

*Primary Examiner* — Bentsu Ro
*Assistant Examiner* — Devon Joseph
(74) *Attorney, Agent, or Firm* — Banner & Witcoff, Ltd.

(57) ABSTRACT

A drive control device includes a signal generation unit, a position detection unit, a speed detection unit, and a drive control unit. Based on at least one light receiving signal inputted from at least one light receiving unit of an encoder, the signal generation unit digitizes the at least one light receiving signal to generate at least one non-interpolated digital encoder signal, and digitizes and interpolates the at least one light receiving signal to generate at least one interpolated digital encoder signal. The position detection unit detects a position of an object based on the at least one interpolated digital encoder signal. The speed detection unit detects a speed of the object based on the at least one non-interpolated digital encoder signal. The drive control unit performs a drive control of the object based on the above-detected position and speed.

21 Claims, 12 Drawing Sheets

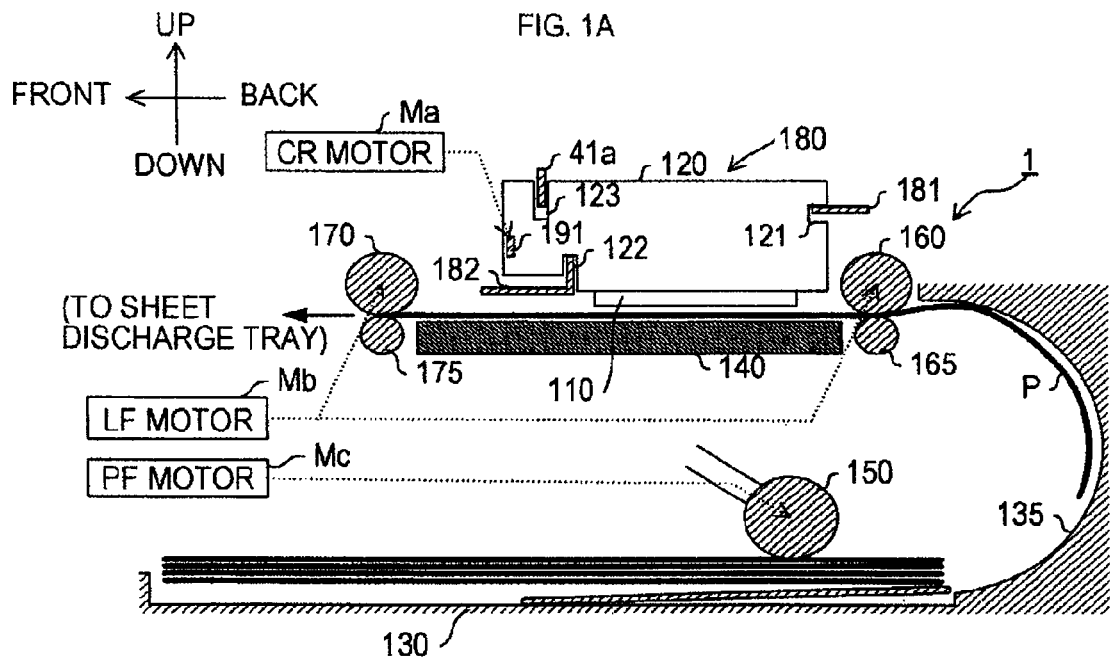
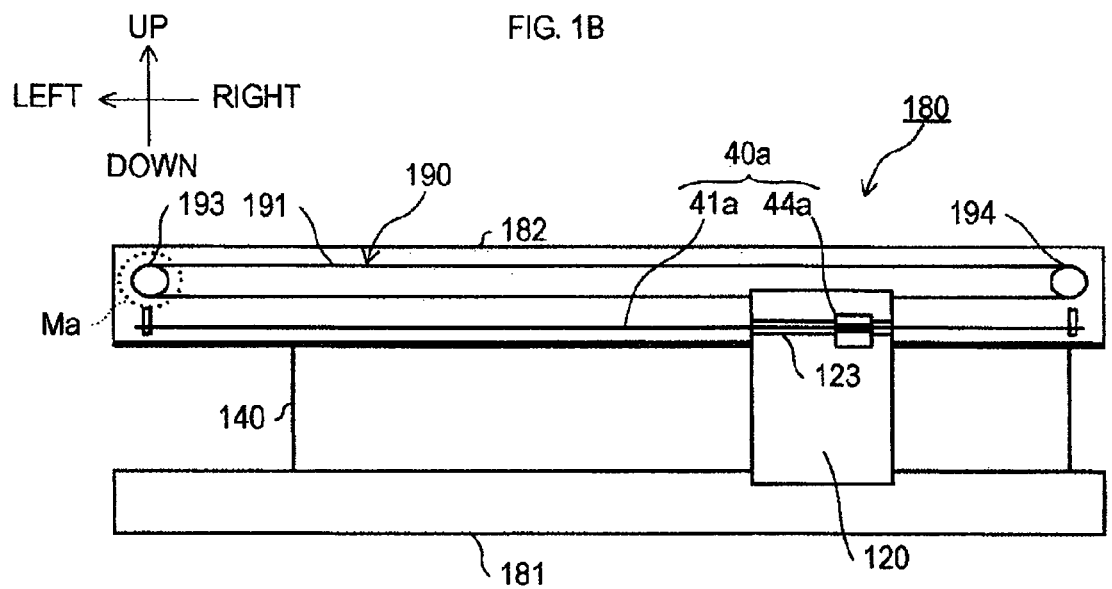

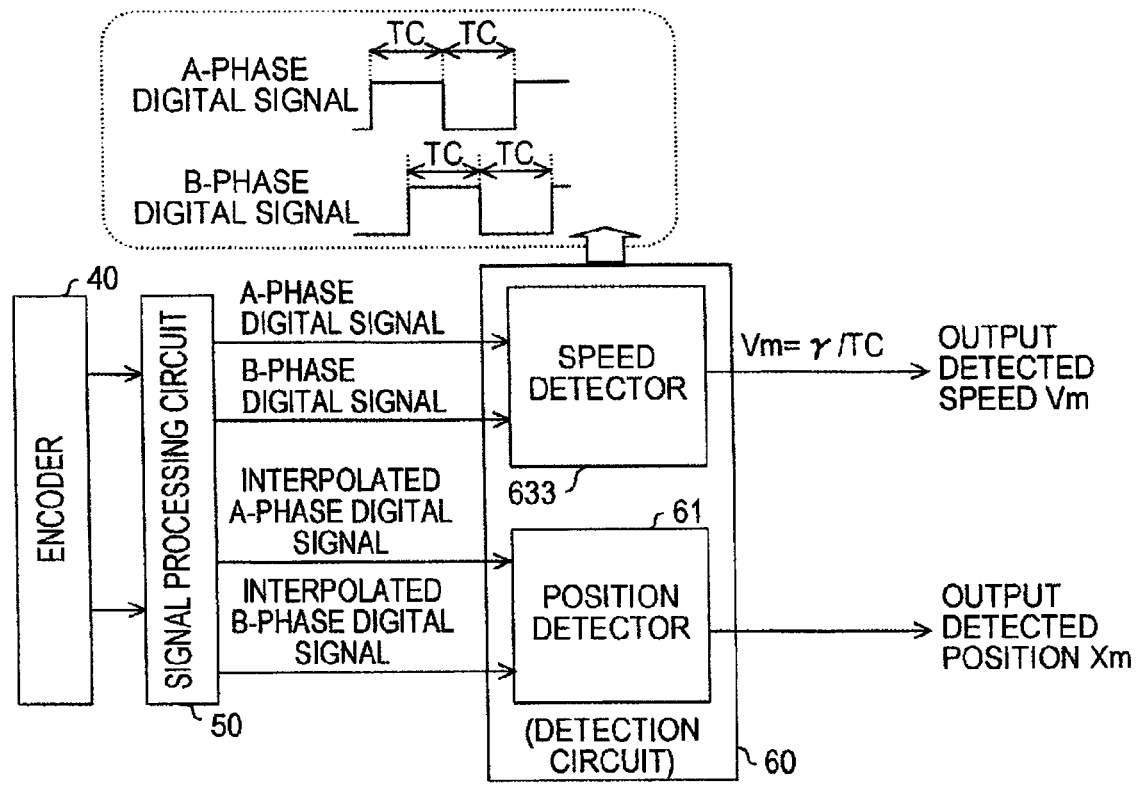

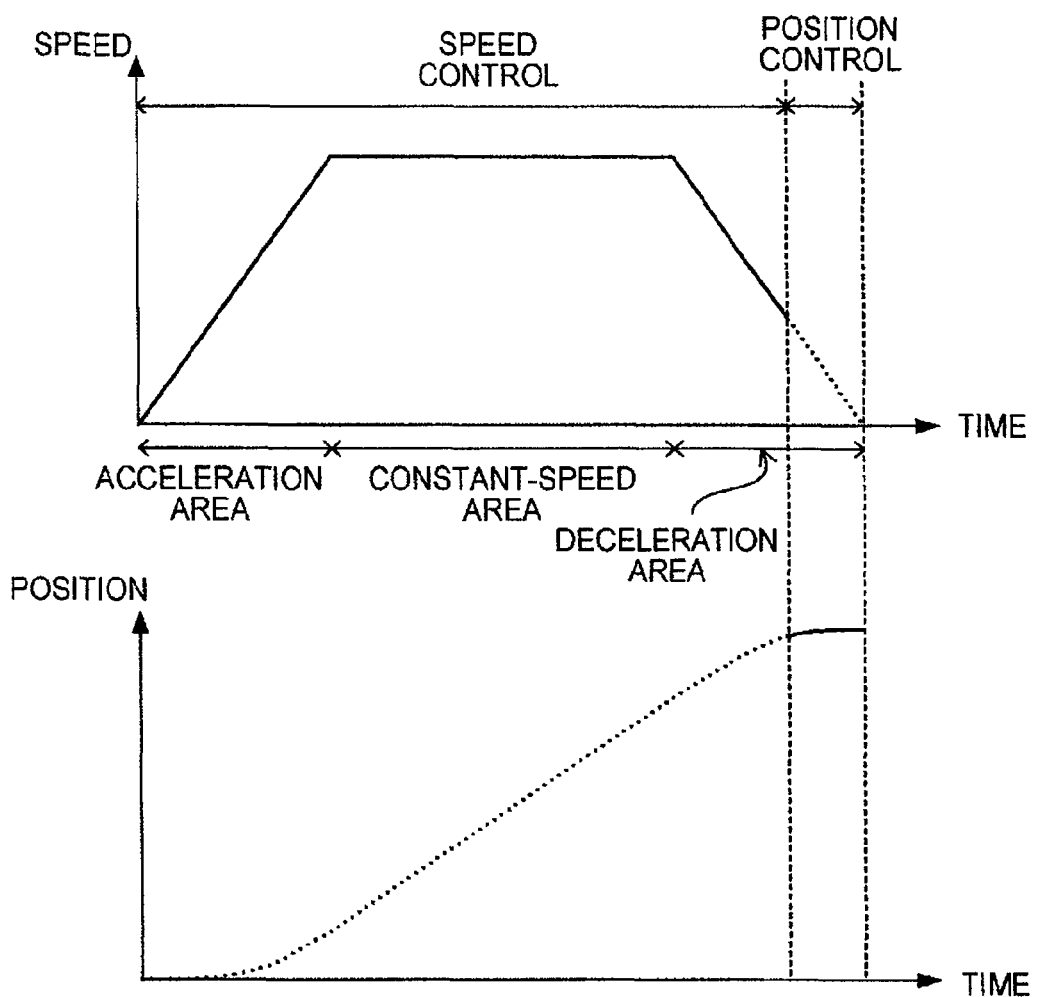

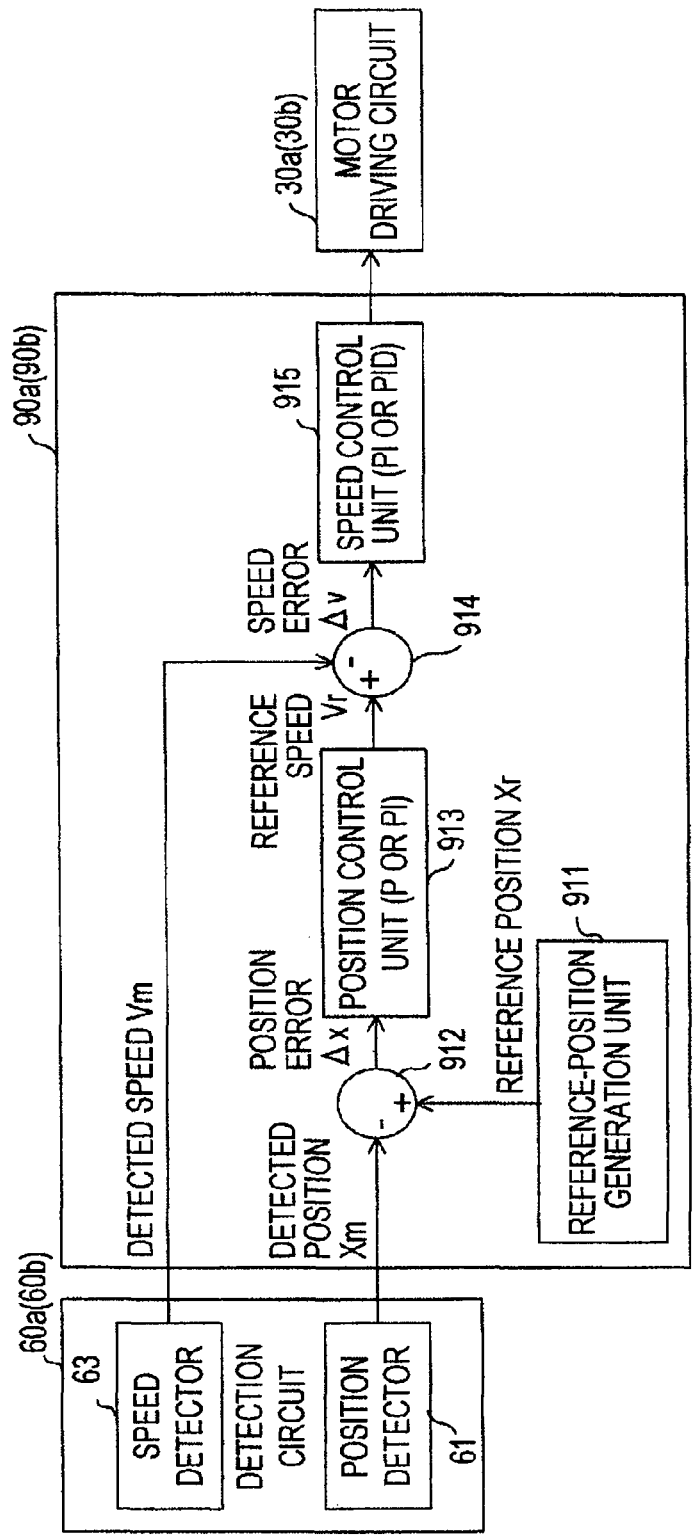

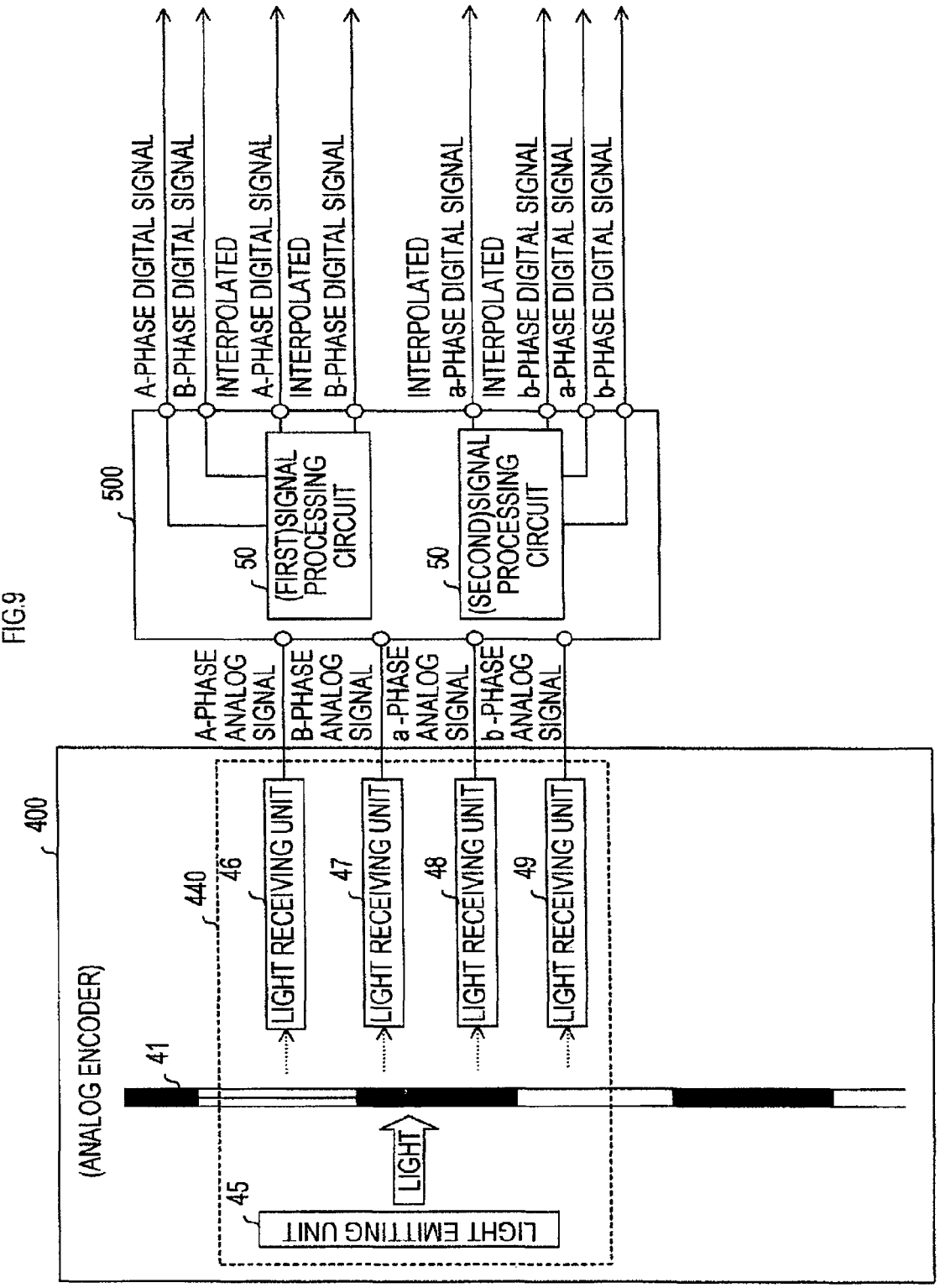

DRIVE CONTROL DEVICE AND DRIVE CONTROL METHOD

CROSS-REFERENCE TO RELATED APPLICATIONS

This application claims the benefit of Japanese Patent Application No. 2010-019041 filed Jan. 29, 2010 in the Japan Patent Office, the disclosure of which is incorporated herein by reference.

BACKGROUND

The present invention relates to a device that detects a position and a speed of an object by using an encoder, and performs a drive control of the object based on detected results. The present invention also relates to a method of performing the above-explained drive control.

Conventionally, there is a known device which detects a position and a speed of an object based on output signals from an encoder, and controls the position or the speed of the object based on detected results.

For example, in an inkjet printer apparatus, each time an image corresponding to a predetermined number of lines is formed onto a sheet by conveying an inkjet head in a main scanning direction, the sheet is conveyed in a sub-scanning direction for a predetermined amount so that a series of images is formed onto the sheet. In this case, in order to accurately convey the sheet for the predetermined amount, following controls are performed: at an initial stage of conveyance of the sheet, a speed control of the sheet is performed based on a speed of the sheet obtained by using an encoder; and at a later stage of the conveyance of the sheet, a position control of the sheet is performed based on a conveyance amount of the sheet obtained by using the encoder.

SUMMARY

In order to improve printing resolution and image quality provided by an inkjet printer apparatus, it is necessary to achieve an accurate conveyance control of a sheet and an accurate conveyance control of an inkjet head. It is possible to achieve a highly accurate conveyance control by improving resolution capability of an encoder. The resolution capability of the encoder can be physically improved by a method such as reducing slit intervals. However, this method is costly.

As a method of improving resolution capability of an encoder in a simple manner, the following method is conventionally known. That is, output signals (encoder signals) of the encoder are interpolated (i.e., multiplied) by an interpolator, thereby generating the encoder signals with high resolution in a simple manner. However, in a case where the position and the speed of the object are detected based on the interpolated encoder signals interpolated by the interpolator, and then, based on detected results, the position and the speed of the object are controlled, the following problem occurs. That is, when the position is detected based on the interpolated encoder signals, an effect of improving a position resolution capability is greater than an influence of position detection errors caused by signal distortion. Thus, as a result of interpolating the encoder signals, an effect of improving control accuracy can be obtained. On the other hand, when the speed of the object is detected based on the interpolated encoder signals, since the speed corresponds to an amount of change in the position, detection errors are greater; therefore, the speed control would be deteriorated due to the detection errors.

Thus, according to one aspect of the present invention, it is desirable to achieve a highly accurate position control and a highly accurate speed control by appropriately detecting a position and a speed of an object based on output signals of an encoder.

A drive control device according to the one aspect of the present invention is a device that performs a drive control of the object by using an encoder. The drive control device includes a signal generation unit, a position detection unit, a speed detection unit, and a drive control unit.

The signal generation unit generates at least one non-interpolated digital encoder signal (i.e., unmultiplied digital encoder signal) and at least one interpolated digital encoder signal (i.e., multiplied digital encoder signal). The generation is based on at least one light receiving signal inputted from at least one light receiving unit of an encoder. The at least one non-interpolated digital encoder signal is generated by digitizing the at least one light receiving signal. The at least one interpolated digital encoder signal is generated by digitizing and interpolating the at least one light receiving signal. The signal generation unit outputs the at least one non-interpolated digital encoder signal and the at least one interpolated digital encoder signal.

The position detection unit detects the position of the object based on the at least one interpolated digital encoder signal inputted from the signal generation unit. The speed detection unit detects the speed of the object based on the at least one non-interpolated digital encoder signal inputted from the signal generation unit. The drive control unit performs the drive control of the object based on the above-detected position detected by the position detection unit and the above-detected speed detected by the speed detection unit.

A drive control method according to another aspect of the present invention is a method to perform a drive control of an object by using the above-mentioned encoder. The drive control method includes a signal generation step, a position detection step, a speed detection step, and a drive control step.

The signal generation step is a step of generating at least one non-interpolated digital encoder signal and at least one interpolated digital encoder signal. The at least one non-interpolated digital encoder signal is generated by digitizing at least one light receiving signal inputted from at least one light receiving unit of the encoder. The at least one interpolated digital encoder signal is generated by digitizing and interpolating the at least one light receiving signal inputted from the at least one light receiving unit of the encoder.

The position detection step is a step of detecting the position of the object based on the at least one interpolated digital encoder signal generated in the signal generation step. The speed detection step is a step of detecting the speed of the object based on the at least one non-interpolated digital encoder signal generated in the signal generation step.

The drive control step is a step of performing the drive control of the object based on the above-detected position detected in the position detection step and the above-detected speed detected in the speed detection step.

BRIEF DESCRIPTION OF THE DRAWINGS

The invention will now be described below, by way of example, with reference to the accompanying drawings, in which:

FIG. 1A shows a constitution of a printer apparatus, in a cross-section perpendicular to a main scanning direction, according to an embodiment of the present invention;

FIG. 1B is a top view showing a constitution of a carriage conveyance mechanism provided along the main scanning direction;

FIG. 6C is a block diagram showing a third constitution example of the detection circuit;

FIG. 7B shows two graphs: the above graph showing an example of a trajectory of a reference speed Vr which can be applied to a CR motor controller and a LF motor controller; the bottom graph showing an example of a trajectory of a reference position Xr which can be applied to the CR motor controller and the LF motor controller;

FIG. 8 is a block diagram illustrating a second constitution example of the motor controller;

FIG. 9 is a block diagram showing a schematic configuration of an analog encoder according to a modified embodiment.

DETAILED DESCRIPTION OF THE PREFERRED EMBODIMENT

Figure 2:
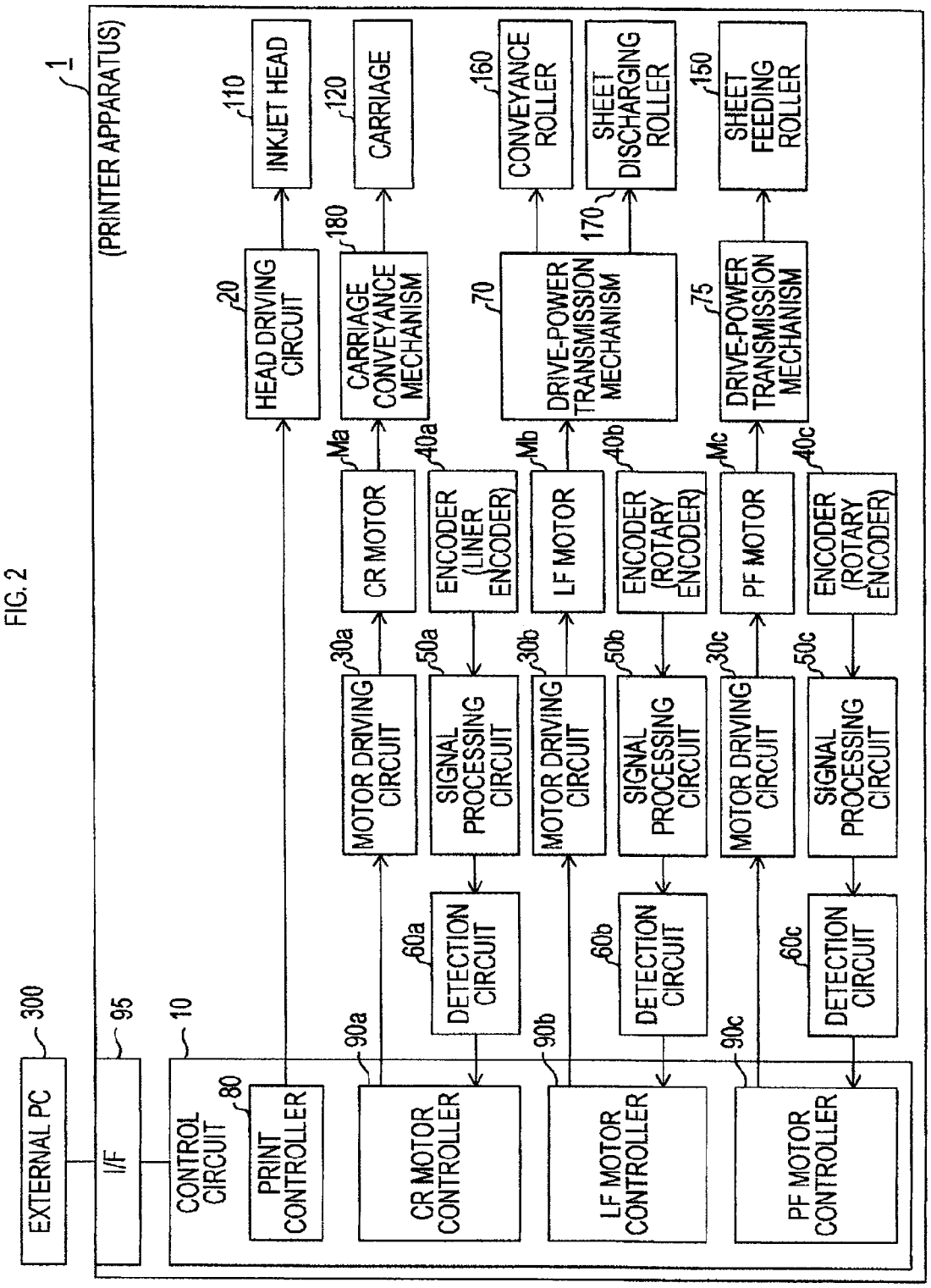
FIG. 2 is a block diagram showing an electrical configuration of the printer apparatus.

A printer apparatus 1 of the present embodiment shown in FIGS. 1A and 1B is an inkjet printer apparatus which conveys a carriage 120 mounting an inkjet head 110 thereon in a main scanning direction (a normal direction to a paper surface in FIG. 1A), to form an image onto the sheet P. The printer apparatus 1 conveys a sheet P stored in a sheet feeding tray 130 in a sub-scanning direction perpendicular to the main scanning direction. The printer apparatus 1 is provided with a sheet feeding roller 150, a conveyance roller 160, and a sheet discharging roller 170, along a sheet conveyance path. The sheet conveyance path is constituted of the sheet feeding tray 130, a U-turn path 135, a platen 140, and others. The printer apparatus 1 is further provided with a conveyance mechanism 180 for the carriage 120, above the platen 140.

In the printer apparatus 1, a motor Mc is driven to rotate the sheet feeding roller 150, thereby separating a stuck of sheets P stored in the sheet feeding tray 130 into each individual sheet P. The individual sheet is fed to the U-turn path 135. As a result of the rotation of the sheet feeding roller 150, the sheet P is conveyed to a nip point between the conveyance roller 160 and a driven roller 165. The conveyance roller 160 and the driven roller 165 are located downstream of the U-turn path 135 in the sheet conveyance path. Hereinafter, the motor Mc which is used to rotate the sheet feeding roller 150 is also referred to as "PF motor".

Each of the conveyance roller 160 and the driven roller 165 has a rotation axis along the main scanning direction. The conveyance roller 160 and the driven roller 165 rotate around the corresponding rotation axes, thereby sandwiching the sheet P therebetween to convey the sheet P to a downstream side in the sheet conveyance path. The conveyance roller 160 is rotated in receipt of a drive power from a motor Mb. Hereinafter, the motor Mb which is used to rotate the conveyance roller 160 is also referred to as "LF motor". The driven roller 165 is driven in accordance with the rotation of the conveyance roller 160, while sandwiching the sheet P with the conveyance roller 160. In this way, the printer apparatus 1 draws the sheet P downward in the sheet conveyance path from the nip point between the conveyance roller 160 and the driven roller 165. Then, the sheet P is conveyed along the platen 140 so as to be set at a print start position.

After completion of setting of the sheet P as above, the printer apparatus 1 stops a conveyance operation of the sheet P. The printer apparatus 1 conveys the carriage 120 in the main scanning direction, and during the conveyance of the carriage 120, makes the inkjet head 110 eject ink droplets. As a result, the printer apparatus 1 forms an image corresponding to a predetermined number of lines onto the sheet P. Specifically, the printer apparatus 1 conveys the carriage 120 for one way to a return point located downstream in the main scanning direction, thereby forming the image corresponding to the predetermined number of lines onto the sheet P.

Next, the carriage conveyance mechanism 180 will be explained. As shown in FIG. 1B, the carriage conveyance mechanism 180 is provided with the carriage 120, frames 181 and 182, and a belt mechanism 190. In the carriage conveyance mechanism 180, the carriage 120 is slidably attached to the frames 181 and 182 extending in the main scanning direction.

The frame 181 is inserted in a groove portion 121 (see, FIG. 1A). The groove portion 121 is formed on a side face of the carriage 120 in a direction parallel to the main scanning direction. The frame 182 has an L-shaped cross section which is perpendicular to a longitudinal direction (the main scanning direction). An L-shaped portion of the frame 182 is inserted in a groove portion 122. The groove portion 122 is formed on an underside face of the carriage 120 in a direction parallel to the main scanning direction. By engaging of the L-shaped portion in the frame 182 with the groove portion 122, the frame 182 functions as a guide rail configured to guide the carriage 120 in the main scanning direction.

The belt mechanism 190 includes an endless belt 191 and a pair of pulleys 193 and 194. One of the pulleys 193 and 194 is arranged at one end of the frame 182 in the main scanning direction, and the other is arranged at the other end of the frame 182. The endless belt 191 is held between the pulleys 193 and 194. The pulley 193 is connected to a motor Ma via a gear. A drive power generated by the Motor Ma is transmitted to the pulley 193 via the gear, thereby rotating the pulley 193. Hereinafter, the Motor Ma is also referred to as "CR motor". The pulley 194 is rotated in accordance with the above-explained rotation of the pulley 193 via the endless belt 191.

The endless belt 191 is connected to the carriage 120. The carriage 120 is moved in the main scanning direction in receipt of a drive power from the CR motor Ma via the endless belt 191. Movement of the carriage 120 is restricted to the main scanning direction by the frames 181 and 182. Therefore, as the CR motor Ma rotates, the carriage 120 is, in conjunction with rotation of the endless belt 191, made to move in the main scanning direction. In the present embodiment, the carriage 120 is conveyed in the main scanning direction by the carriage conveyance mechanism 180 constituted as above. The above-mentioned "one way" refers to each of an outward journey and a homeward journey of the carriage 120 which reciprocally moves in the main scanning direction by the rotation of the endless belt 191. In the outward journey, the carriage 120 travels from a side of the pulley 193 to a side of the pulley 194 in the main scanning direction. In the homeward journey, the carriage 120 travels from the side of the pulley 194 to the side of the pulley 193 in the main scanning direction.

In the printer apparatus 1, after the image corresponding to the predetermined number of lines is formed onto the sheet P by conveying the carriage 120 in the main scanning direction for one way, the conveyance roller 160 is made to rotate to convey the sheet P in the sub-scanning direction for the predetermined number of lines. Thereafter, a conveyance operation of the sheet P is made to stop. After that, the carriage 120 is conveyed once again for one way and at the same time, the inkjet head 110 is made to eject ink droplets. Thereby, an image corresponding to the predetermined number of lines is formed onto the sheet P.

As explained above, the printer apparatus 1 repeatedly and alternatively performs the following two operations: forming an image corresponding to the predetermined number of lines onto the sheet P by conveying the carriage 120 for one way, and conveying the sheet P in the sub-scanning direction for the predetermined number of lines. Thereby, the printer apparatus 1 forms a series of images onto the sheet P on the platen 140 based on image data of a print object received from an external personal computer 300 via an interface 95 (see, FIG. 2).

In the process of the above operations, the sheet P reaches a nip point between the sheet discharging roller 170 and a driven roller 175, both of which are located downstream of the platen 140 in the sheet conveyance path. The sheet discharging roller 170 and the driven roller 175 are disposed opposing to each other in the same positional relationship as that between the conveyance roller 160 and the driven roller 165. The sheet discharging roller 170 is rotated in receipt of the same drive power of the LF motor Mb as the drive power the conveyance roller 160 receives. Therefore, the sheet P, which has reached the nip point between the sheet discharging roller 170 and the driven roller 175, is further conveyed downstream by the rotation of the sheet discharging roller 170 which rotates in conjunction with the rotation of the conveyance roller 160. Eventually, the sheet. P is discharged to a not-shown sheet discharge tray.

Next, the printer apparatus 1 will be explained with regard to detailed constitutions of a conveyance control of the carriage 120 and a conveyance control of the sheet P conveyed by the sheet feeding roller 150 and the conveyance roller 160. As shown in FIG. 2, the printer apparatus 1 is configured to control each part of the printer apparatus 1 via a control circuit 10. The printer apparatus 1 includes, in addition to the control circuit 10, a head driving circuit 20, motor driving circuits 30a, 30b, and 30c, analog encoders 40a, 40b, and 40c, signal processing circuits 50a, 50b, and 50c, and detection circuits 60a, 60b, and 60c.

The head driving circuit 20 drives the inkjet head 110 in accordance with control signals inputted from the control circuit 10, thereby making the inkjet head 110 eject ink droplets. The motor driving circuits 30a, 30b, and 30c respectively drive the motors Ma, Mb, and Mc respectively connected thereto, with input currents or input voltages which respectively correspond to manipulated variables respectively inputted thereto from the control circuit 10.

Specifically, the motor driving circuit 30a drives the CR motor Ma based on a manipulated variable Ua inputted from the control circuit 10. The drive power generated by the CR motor Ma is transmitted to the carriage 120 via the carriage conveyance mechanism 180. As a result, the carriage 120 and the inkjet head 110 are conveyed in the main scanning direction at a rate corresponding to the manipulated variable Ua.

The motor driving circuit 30b drives the LF motor Mb based on a manipulated variable Ub inputted from the control circuit 10. The drive power generated by the LF motor Mb is transmitted to the conveyance roller 160 and the sheet discharging roller 170 via a drive-power transmission mechanism 70 constituted of a gear and others. As a result, the conveyance roller 160 and the sheet discharging roller 170 are rotated, and the sheet P is conveyed at a rate corresponding to a rotation rate of the conveyance roller 160 and the sheet discharging roller 170 for a distance corresponding to an amount of the rotation.

Moreover, the motor driving circuit 30c drives the PF motor Mc based on a manipulated variable Uc inputted from the control circuit 10. A drive power generated by the PF motor Mc is transmitted to the sheet feeding roller 150 via a drive-power transmission mechanism 75 constituted of a gear and others. As a result, the sheet feeding roller 150 is rotated.

Each of the analog encoders 40a, 40b, and 40c is constituted in the same manner as a known analog encoder. The analog encoders 40a, 40b, and 40c have a same basic constitution as one another. Accordingly, hereinafter, the analog encoders 40a, 40b, and 40c are generalized as an analog encoder 40, and common constitutions of the analog encoders 40a, 40b, and 40c will be explained by explaining constitutions of the analog encoder 40. In other words, the analog encoder 40 explained below represents each of the analog encoders 40a, 40b, and 40c.

Figure 3A:
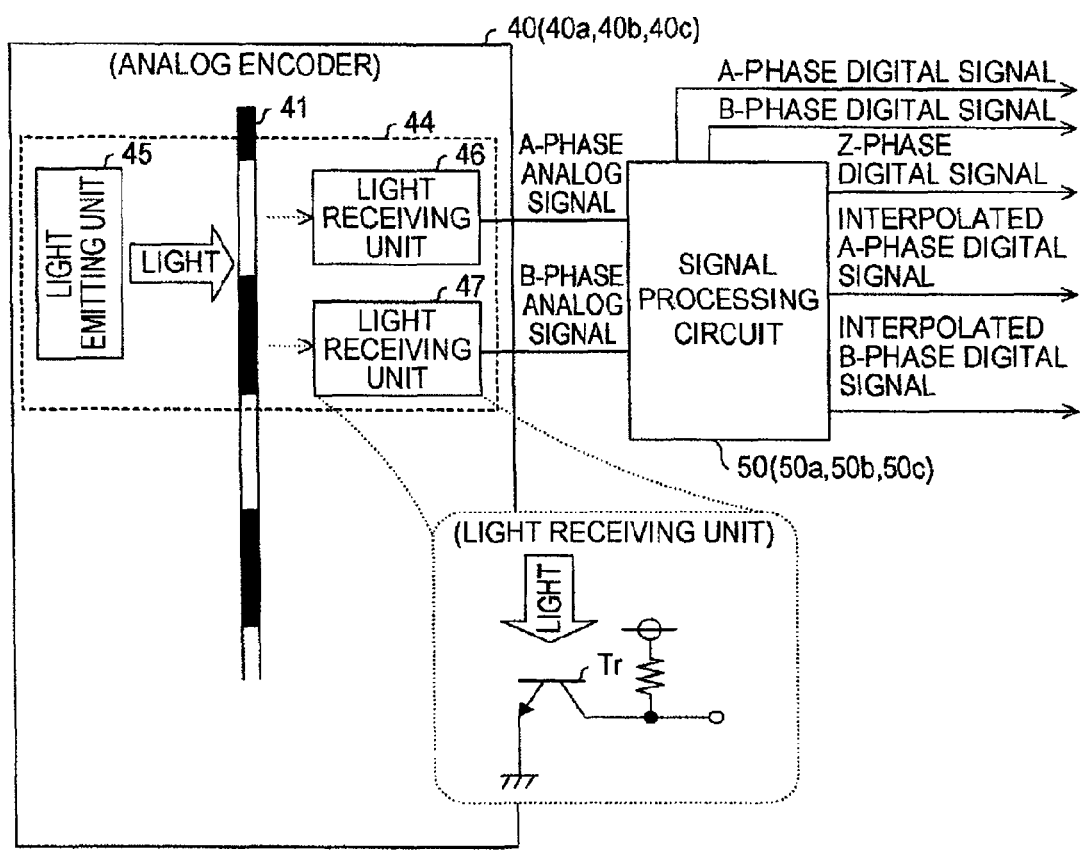
FIG. 3A is a block diagram showing a schematic configuration of an analog encoder.

As shown in FIG. 3A, the analog encoder 40 includes an encoder scale 41 and a sensor body 44. In the encoder scale 41, equally-spaced slits are formed. The sensor body 44 is constituted of a light emitting unit 45 and a pair of light receiving units 46 and 47.

In the analog encoder 40, the light receiving units 46 and 47 receive output lights outputted from the light emitting unit 45 via the encoder scale 41, and then output a light receiving signal (sine wave) which corresponds to an amount of received output lights. In the same way as a known encoder, the pair of the light receiving units 46 and 47 are disposed having a positional relationship in which a phase difference between the light receiving signals (sine wave) outputted from each of the light receiving units 46 and 47 is $\pi/2$. That is, a distance between the light receiving units 46 and 47 is a quarter of a distance of slit intervals of the encoder scale.

Specifically, the light emitting unit 45 is, for example, constituted of a light emitting diode. As shown in FIG. 3A, the light receiving units 46 and 47 are, for example, constituted in the same way as in a known photo interrupter having a phototransistor Tr.

FIG. 3A shows a transmissive encoder as the analog encoder 40. In the transmissive encoder, the output lights from the light emitting unit 45 are transmitted through the encoder scale 41, and the transmitted lights are received by the light receiving units 46 and 47. As the analog encoder, a reflective encoder is also known. In the reflective encoder, output lights from a light emitting unit are reflected by an encoder scale, and the reflected lights are received by light receiving units. In view of the above, as the analog encoders 40a, 40b, and 40c of the present embodiment, it may be possible to adopt the reflective encoder, in place of the transmissive encoder.

Next, individual constitutions of each of the analog encoders 40a, 40b, and 40c will be explained. As shown in FIG. 1B, the analog encoder 40a of the printer apparatus 1 according to the present embodiment is constituted as a liner encoder.

The analog encoder 40a is constituted of a longitudinal encoder scale 41a fixed to the frame 182 in the main scanning direction and a sensor body 44a fixed to the carriage 120. The encoder scale 41a is inserted in a groove portion 123 of the carriage 120. The sensor body 44a is fixed to the carriage 120 in such a manner that the encoder scale 41a is interposed between a light emitting unit 45a, and light receiving units 46a and 47a. In the following description, a reference numeral is given to each unit of the analog encoder 40a in such a manner that a numeral assigned to a unit of the analog encoder 40 is assigned to the corresponding unit of the analog encoder 40a with a suffix "a" corresponding to the suffix of the analog encoder 40a. Similarly, a reference numeral is given to each unit of the analog encoder 40b and 40c.

The analog encoder 40a outputs a sine wave that corresponds to a change in a relative positional relationship between the encoder scale 41a and the sensor body 44a in accordance with movement of the carriage 120. The sine wave is outputted as an A-phase analog signal and a B-phase analog signal from the sensor body 44a. The A-phase analog signal and the B-phase analog signal are inputted to the signal processing circuit 50a.

Figure 3B:
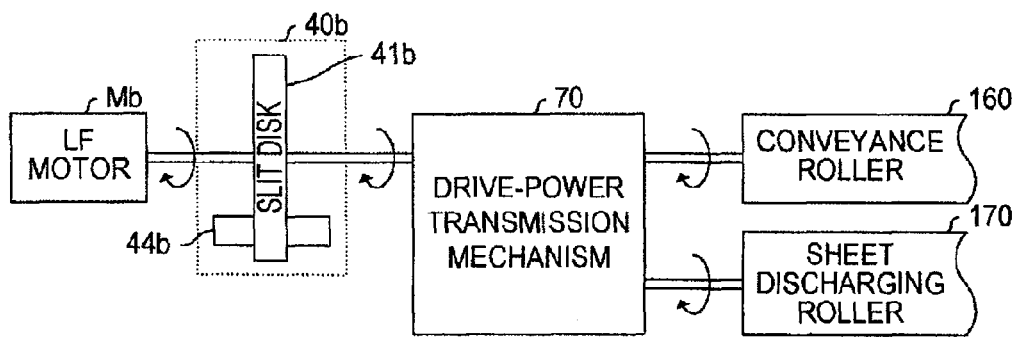
FIG. 3B shows an example of installation of the analog encoder.

Each of the analog encoders 40b and 40c is constituted as a rotary encoder. FIG. 3B is a conceptual view showing an installment example of the analog encoder 40b. The analog encoder 40b is constituted of an encoder scale 41b and a sensor body 44b. The encoder scale 41b is constituted of a slit disk. The encoder scale 41b is provided so as to be attached to a rotation shaft of the LF motor Mb. The sensor body 44b is provided independently of a rotation system of the encoder scale 41b in such a manner that the encoder scale 41b is interposed between a light emitting unit 45b, and light receiving units 46b and 47b.

The analog encoder 40b outputs a sine wave that corresponds to a change in a relative positional relationship between the encoder scale 41b and the sensor body 44b in accordance with rotation of the LF motor Mb. The sine wave is outputted as an A-phase analog signal and a B-phase analog signal from the sensor body 44b. The A-phase analog signal and the B-phase analog signal are inputted to the signal processing circuit 50b. In other words, the analog encoder 40b outputs, as the A-phase analog signal and the B-phase analog signal, the sine wave corresponding to rotation of the conveyance roller 160.

Further, the analog encoder 40c is provided on a rotation shaft of the PF motor Mc based on the same principle as the analog encoder 40b. The analog encoder 40c outputs a sine wave that corresponds to rotation of the PF motor Mc (and therefore, rotation of the sheet feeding roller 150). The sine wave is outputted as an A-phase analog signal and a B-phase analog signal which are then inputted to the signal processing circuit 50c.

Next, constitutions of the signal processing circuits 50a, 50b, and 50c will be explained. The signal processing circuits 50a, 50b, and 50c have the same circuit configuration as one another, except for a difference of input sources for target signals to be processed and output sources. Accordingly, hereinafter, the signal processing circuits 50a, 50b, and 50c are generalized as a signal processing circuit 50, and a configuration of the signal processing circuit 50 will be explained. The signal processing circuit 50 represents each of the signal processing circuits 50a, 50b, and 50c. Each of the signal processing circuits 50a, 50b, and 50c is constituted in the same manner as the signal processing circuit 50.

Figure 4:
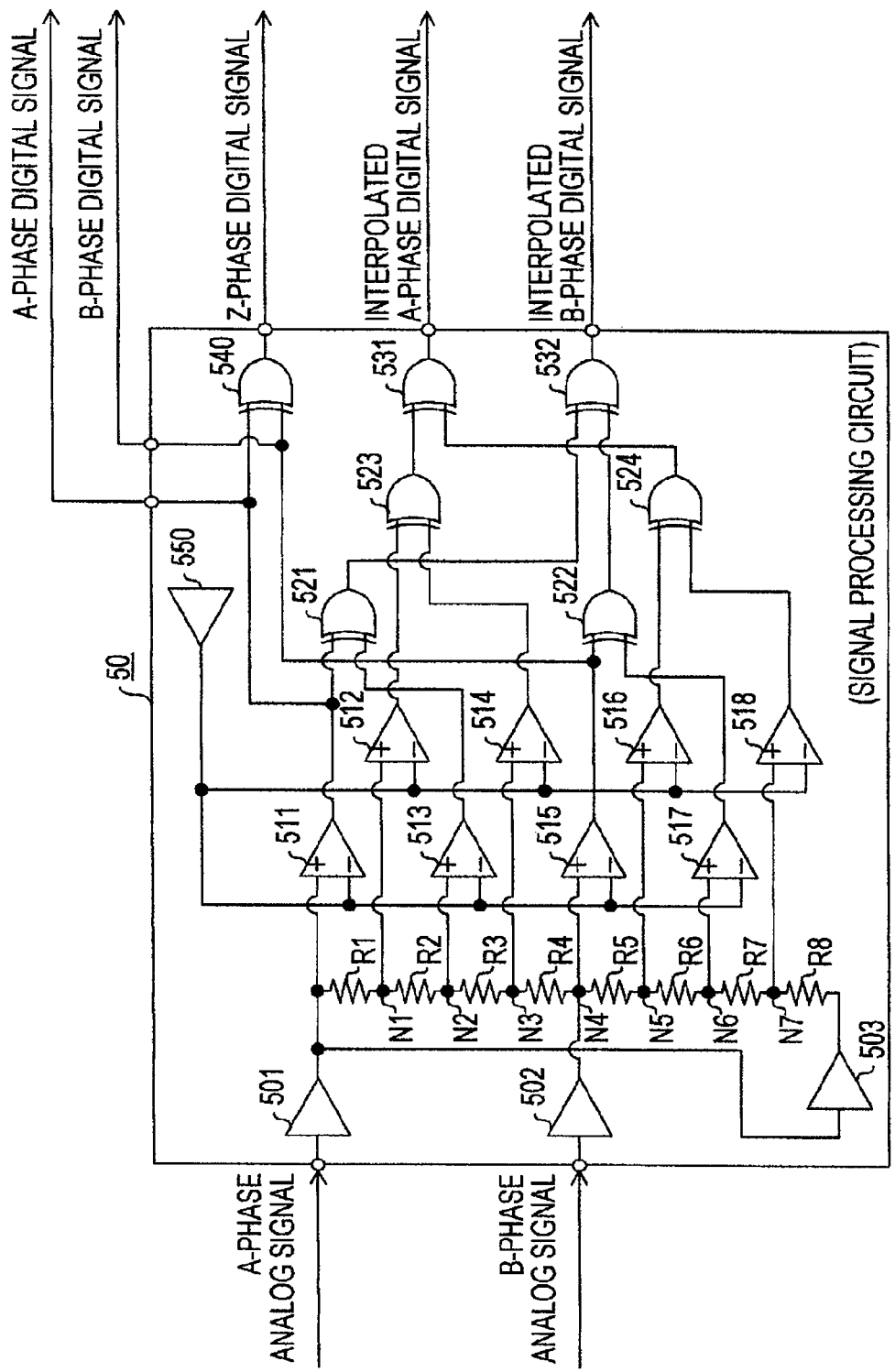
FIG. 4 is a block diagram showing a constitution of a signal processing circuit.

As shown in FIG. 4, the signal processing circuit 50 is provided with amplifiers 501 and 502, an inverting amplifier 503, comparators 511-518, XOR circuits 521-524, 531, 532, and 540, a reference-voltage setting unit 550, and a resistor array. In the resistor array, resistors R1-R8 having a same resistance value are series-connected.

A minus terminal of each of the comparators 511-518 is connected to the reference-voltage setting unit 550. To these minus terminals, a reference voltage set by the reference-voltage setting unit 550 is inputted. On the other hand, a plus terminal of the comparator 511 is connected to an output terminal of the amplifier 501 to which the A-phase analog signal is inputted from the analog encoder 40. To the plus terminal, an amplified A-phase analog signal amplified by the amplifier 501 is inputted.

A plus terminal of the comparator 512 is connected to a node N1 between the resistors R1 and R2. The resistor R1 has an end opposite to the node N1, and the amplifier 501 is connected to the end. To the plus terminal of the comparator 512, the A-phase analog signal outputted from the analog encoder 40 is inputted via the amplifier 501 and the resistor R1.

Similarly, a plus terminal of the comparator 513 is connected to a node N2 between the resistors R2 and R3. A plus terminal of the comparator 514 is connected to a node N3 between the resistors R3 and R4. A plus terminal of the comparator 515 is connected to a node N4 between the resistors R4 and R5. A plus terminal of the comparator 516 is connected to a node N5 between the resistors R5 and R6. A plus terminal of the comparator 517 is connected to a node N6 between the resistors R6 and R7. A plus terminal of the comparator 518 is connected to a node N7 between the resistors R7 and R8. Moreover, the node N4 is connected to an output terminal of the amplifier 502 to which the B-phase analog signal is inputted from the analog encoder 40. Thus, to the plus terminal of the comparator 515, an amplified B-phase analog signal amplified by the amplifier 502 is inputted.

The resistor R8 has an end opposite to the node N7, and an output terminal of the inverting amplifier 503 is connected to the end. To the inverting amplifier 503, the A-phase analog signal is inputted from the analog encoder 40. Thus, to the above end of the resistor R8, an inversion signal of the A-phase analog signal is inputted.

Moreover, the XOR circuit 521 is inputted with output signals of the comparators 511 and 513. The XOR circuit 522 is inputted with output signals of the comparators 515 and 517. The XOR circuit 523 is inputted with output signals of the comparators 512 and 514. The XOR circuit 524 is inputted with output signals of the comparators 516 and 518. The XOR circuit 531 is inputted with output signals of the XOR circuits 523 and 524. The XOR circuit 532 is inputted with output signals of the XOR circuits 521 and 522. The XOR circuit 540 is inputted with output signals of the comparators 511 and 515.

That is, in the signal processing circuit 50, the reference voltage and an input voltage of the A-phase analog signal are compared by the comparator 511. If the input voltage of the A-phase analog signal is higher than the reference voltage, the comparator 511 outputs a High-level signal. If the input voltage of the A-phase analog signal is lower than the reference voltage, the comparator 511 outputs a Low-level signal. Thereby, the A-phase analog signal inputted from the analog encoder 40 is digitized by the comparator 511. Similarly, in the signal processing circuit 50, the B-phase analog signal inputted from the analog encoder 40 is amplified by the amplifier 502 and then digitized by the comparator 515. The A-phase analog signal and B-phase analog signal digitized as above are, respectively as an A-phase digital signal and a B-phase digital signal, outputted outside of the signal processing circuit 50.

The signal processing circuit 50 generates an exclusive OR (XOR) signal of the A-phase digital signal and the B-phase digital signal digitized as above in the XOR circuit 540, thereby generating a digital Z-phase signal. The digital Z-phase is a digital signal having rising edges and falling edges corresponding to edges of the A-phase digital signal and the B-phase digital signal. The digital Z-phase signal (exclusive OR signal) is outputted outside.

Moreover, in the signal processing circuit 50, the A-phase analog signal and the B-phase analog signal inputted from the analog encoder 40 are interpolated by four and digitized by the comparators 511-518 and the XOR circuits 521-524, 531, and 532, and then outputted. Specifically, in the XOR circuit 531, an interpolated A-phase digital signal, which is a signal generated by digitizing and interpolating the A-phase analog signal by four, is eventually generated and outputted. Similarly, in the XOR circuit 532, an interpolated B-phase digital signal, which is a signal generated by digitizing and interpolating the B-phase analog signal by four, is eventually generated and outputted.

Figure 5:
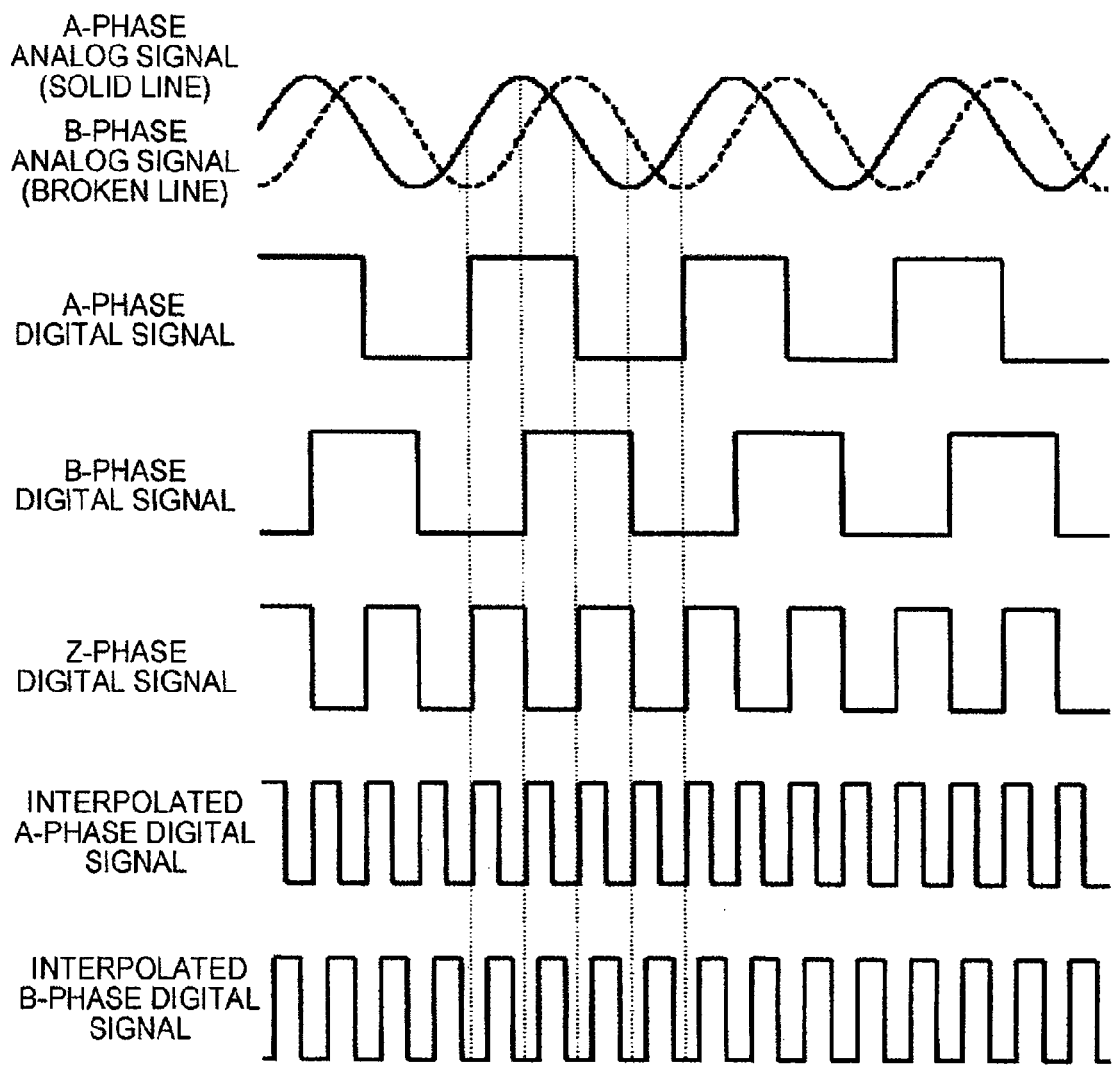
FIG. 5 is a timing chart showing various signal waveforms.

The signal processing circuit 50 has been explained as above. FIG. 5 shows a schematic diagram of a signal waveform of each of the following signals: the A-phase analog signal and B-phase analog signal which are inputted to the signal processing circuit 50 from the analog encoder 40; and the A-phase digital signal, the B-phase digital signal, the Z-phase digital signal, the interpolated A-phase digital signal, and the interpolated B-phase digital signal, which are outputted from the signal processing circuit 60.

The A-phase digital signal, the B-phase digital signal, the Z-phase digital signal, the interpolated A-phase digital signal, and the interpolated B-phase digital signal outputted from each of the signal processing circuits 50*a*, 50*b*, and 50*c* constituted as above are inputted to the detection circuits 60*a*, 60*b*, and 60*c* corresponding respectively to the signal processing circuits 50*a*, 50*b*, and 50*c* (see, FIG. 2).

Next, detailed constitutions of the detection circuits 60*a*, 60*b*, and 60*c* will be explained. The detection circuits 60*a*, 60*b*, and 60*c* may include a same constitution as one another. Accordingly, hereinafter, the detection circuits 60*a*, 60*b*, and 60*c* are generalized as a detection circuit 60, and a configuration of the detection circuit 60 will be explained. The detection circuit 60 represents each of the detection circuits 60*a*, 60*b*, and 60*c*. Each of the detection circuits 60*a*, 60*b*, and 60*c* is constituted in the same manner as the detection circuit 60. Moreover, the detection circuit 60 may be constituted in various manners. Hereinafter, a plurality of constitutional examples of the detection circuit 60 will be explained with reference to FIGS. 6A, 6B, and 6C.

<A First Constitution Example of the Detection Circuit 60>

Figure 6A:
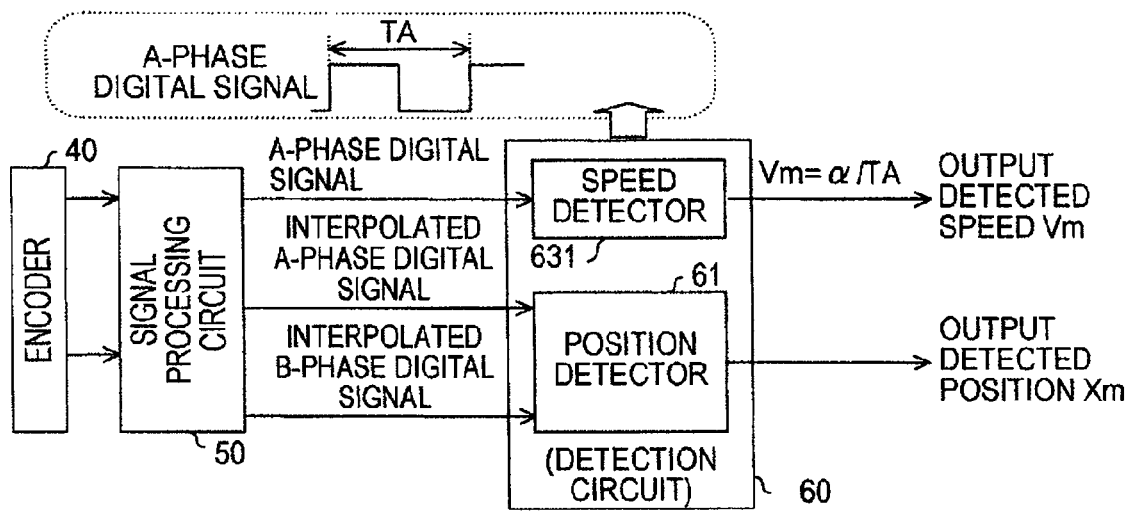
FIG. 6A is a block diagram showing a first constitution example of a detection circuit.

As shown in FIG. 6A, the detection circuit 60 according to the first constitution example includes a position detector 61 and a speed detector 631. The position detector 61 detects a position of an object based on the interpolated A-phase digital signal and the interpolated B-phase digital signal inputted from the signal processing circuit 50. The speed detector 631 detects a speed of the object based on the A-phase digital signal inputted from the signal processing circuit 50. The object, whose position and speed are detected by the detection circuit 60*a*, is the carriage 120 (i.e., the inkjet head 110). The object, whose position and speed are detected by the detection circuit 60*b*, is the conveyance roller 160. The object, whose position and speed are detected by the detection circuit 60*c*, is the sheet feeding-roller 150.

The position detector 61 detects a moving direction of the object, based on whether or not a phase value of the interpolated A-phase digital signal is larger by π/2 than a phase value of the interpolated B-phase digital signal inputted from the signal processing circuit 50. Based on detected results, if the moving direction is a positive direction, each time a rising edge of the interpolated A-phase digital signal (or a rising edge of the interpolated B-phase digital signal) is detected, a value of a position counter included inside the position detector 61 is incremented by 1. On the other hand, if the moving direction is a negative direction, the value of the position counter is decremented by 1. Based on the value shown by the position counter, the position of the object is detected. Hereinafter, a detected position is represented by using a variable Xm.

The speed detector 631 detects the speed of the object, based on the A-phase digital signal inputted from the signal processing circuit 50. Specifically, the speed detector 631 detects the speed of the object by measuring an input time interval TA of the rising edge of the A-phase digital signal. Hereinafter, a detected speed is represented by using a variable Vm. If a distance corresponding to one cycle of the A-phase digital signal is represented as α, the detected speed Vm is expressed by Vm=α/TA. Based on the above expression, the speed detector 631 included in the detection circuit 60 detects (calculates) the speed of the object by using a latest measured value of the input time interval TA, and outputs the detected speed Vm.

Specifically, a position detector 61*a* included in the detection circuit 60*a* detects a moving direction and a position of the carriage 120 (and therefore, the inkjet head 110) in the above explained manner, based on the interpolated A-phase digital signal and the interpolated B-phase digital signal inputted from the signal processing circuit 50*a*. In the following description, a reference numeral is given to each unit of the detection circuit 60*a* in such a manner that a numeral assigned to a unit of the detection circuit 60 is assigned to the corresponding unit of the detection circuit 60*a* with a suffix "a" corresponding to the suffix of the detection circuit 60*a*. Similarly, a reference numeral is given to each unit of the detection circuits 60*b* and 60*c*.

A speed detector 631*a* included in the detection circuit 60*a* detects a moving speed of the carriage 120 (and therefore, the inkjet head 110) in the above explained manner, based on the A-phase digital signal inputted from the signal processing circuit 50*a*.

A position detector 61*b* included in the detection circuit 60*b* detects a rotation direction and a rotation position of the conveyance roller 160 (and therefore, a conveyance amount of the sheet P) in the above explained manner, based on the interpolated A-phase digital signal and the interpolated B-phase digital signal inputted from the signal processing circuit 50*b*. A speed detector 631*b* included in the detection circuit 60*b* detects a rotation speed of the conveyance roller 160 (and therefore, a conveyance speed of the sheet P) in the above explained manner, based on the digital A-phase signal inputted from the signal processing circuit 50*b*. The rotation position detected by the position detector 61*b* represents a rotation amount of the conveyance roller 160 from an initial position of the conveyance roller 160.

The printer apparatus 1 is provided with a sensor (not shown) capable of detecting an edge of a sheet, in a vicinity upstream of the conveyance roller 160 in the sheet conveyance path. When the sensor detects a front edge of a new sheet, a position counter of the position detector 61*b* included in the detection circuit 60*b* is reset to zero. As a result, the detected position Xm detected by the position detector 61*b* of the detection circuit 60*b* is approximately equal to the conveyance amount of the sheet P conveyed by the conveyance roller 160.

Similarly, the detection circuit 60c detects a rotation direction and a rotation position of the sheet feeding roller 150 (and therefore, a conveyance amount of the sheet P) based on the interpolated A-phase digital signal and the interpolated B-phase digital signal inputted from the signal processing circuit 50c. The detection circuit 60c also detects a rotation speed of the sheet feeding roller 150 (and therefore, a conveyance speed of the sheet P) based on the digital A-phase signal inputted from the signal processing circuit 60c. A position counter of a position detector 61c included in the detection circuit 60c is reset to zero, each time a feeding operation of each of the sheets P is performed. As a result, the detected position Xm detected by the position detector 61c of the detection circuit 60c is approximately equal to the conveyance amount of the sheet P from the sheet feeding tray 130.

<A Second Constitution Example of the Detection Circuit 60>

Figure 6B:
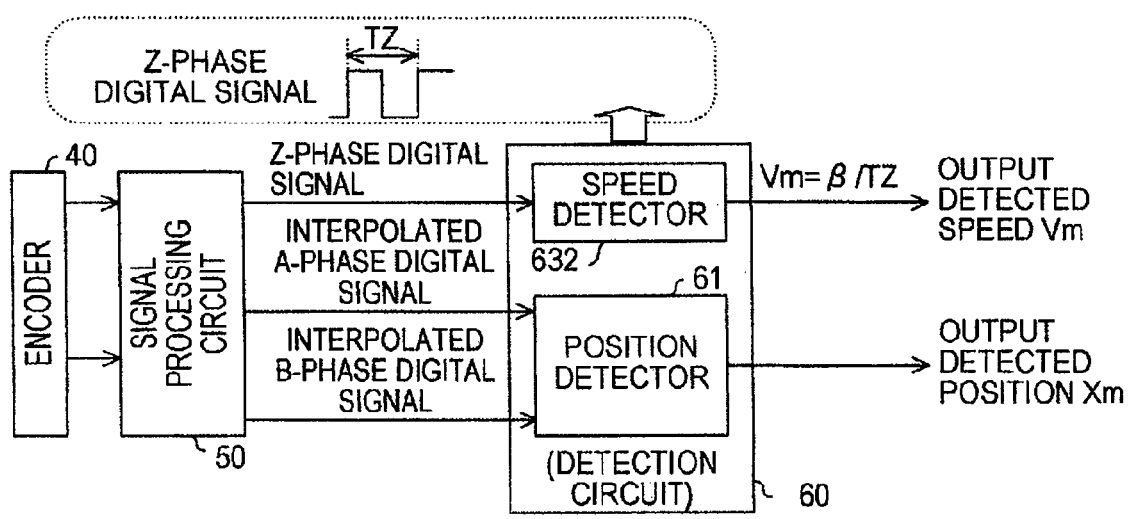
FIG. 6B is a block diagram showing a second constitution example of the detection circuit.

Referring to FIG. 6B, the second constitution example of the detection circuit 60 will be explained. The detection circuit 60 according to the second constitution example includes the position detector 61 having the same constitution as in the first constitution example, and further includes a speed detector 632. The speed detector 632 detects a speed of an object based on the Z-phase digital signal inputted from the signal processing circuit 50. Specifically, the speed detector 632 detects the speed of the object by measuring an input time interval TZ of a rising edge of the Z-phase digital signal. A distance corresponding to one cycle of the Z-phase digital signal is expressed by $\beta=\alpha/2$. Based on the expression $Vm=\beta/TZ$, the speed detector 632 detects (calculates) the speed of the object by using a latest measured value of the input time interval TZ, and outputs the detected speed Vm.

That is, a speed detector 632a included in the detection circuit 60a detects a moving speed of the carriage 120 (and therefore, the inkjet head 110) based on the Z-phase digital signal inputted from the signal processing circuit 50a. A speed detector 632b included in the detection circuit 60b detects a rotation speed of the conveyance roller 160 (and therefore, a conveyance speed of the sheet P) based on the Z-phase digital signal inputted from the signal processing circuit 50b. The second constitution example provides an advantage of improving a time resolution capability of the detected speed than that of the first constitution example.

<A Third Constitution Example of the Detection Circuit 60>

Referring to FIG. 6C, the third constitution example of the detection circuit 60 will be explained. The detection circuit 60 according to the third constitution example includes the position detector 61 having the same constitution as in the first constitution example, and further includes a speed detector 633. The speed detector 633 detects a speed of an object based on the A-phase digital signal and the B-phase digital signal inputted from the signal processing circuit 50. Specifically, the speed detector 633 measures an input time interval TC of edges (a rising edge and a falling edge) of the A-phase digital signal in parallel with measuring an input time interval TC of edges (a rising edge and a falling edge) of the B-phase digital signal. The speed detector 633 detects (calculates) the speed of the object based on a latest measured value of either the time interval TC of the edges of the A-phase digital signal or the time interval TC of the edges of the B-phase digital signal, whichever is the latest.

Specifically, the speed detector 633 detects (calculates) the speed of the object as follows. A distance corresponding to a one-half cycle of each of the A-phase digital signal and the B-phase digital signal is expressed by $\gamma=\alpha/2$. Based on the expression $Vm=\gamma/TC$, the speed detector 633 detects (calculates) the speed of the object by using a latest measured value of the input time interval TC, and outputs the detected speed Vm. The third constitution example provides an advantage of further improving a time resolution capability of the detected speed.

As above, the constitutions of the detection circuit 60 have been explained. Functions of the detection circuits 60a, 60b, and 60c, which correspond to the detection circuit 60, constituted as above may also be realized by a program executed by a microcomputer. Moreover, if the first constitution example is applied to the detection circuits 60a, 60b, and 60c, the detection circuits 60a, 60b, and 60c may be configured to detect the speed based on the digital B-phase signal, instead of the digital A-phase signal. Moreover, the detection circuits 60a, 60b, and 60c should not be limited to the above-explained constitutions. The detection circuits 60a, 60b, and 60c may be configured to detect the position and the speed in various manners other than the above. Furthermore, each of the detection circuits 60a, 60b, and 60c may be and may not be constituted in the same manner as one another. That is, any one of the first to the third constitution examples can be independently applied to any one of the detection circuits 60a, 60b, and 60c. For example, the first constitution example may be applied to the detection circuit 60a, and the third constitution example may be applied to the detection circuit 60b.

Next, detailed constitutions of the control circuit 10 will be explained with reference to FIGS. 2, 7A, 7B, and 8. As shown in FIG. 2, the control circuit 10 includes a print controller 80, a CR motor controller 90a, a LF motor controller 90b, and a PF motor controller 90c. The print controller 80 inputs control signals to the head driving circuit 20, thereby controlling ejection of ink droplets. The CR motor controller 90a controls the CR motor Ma so as to control conveyance of the carriage 120. The LF motor controller 90b controls the LF motor Mb so as to control the conveyance roller 160 (and therefore, to control conveyance of the sheet P). The PF motor controller 90c controls the PF motor Mc so as to control the sheet feeding roller 150 (and therefore, to control feeding of the sheet P).

The CR motor controller 90a calculates a manipulated variable Ua for the CR motor Ma, based on the detected speed Vm and the detected position Xm of the carriage 120 inputted from the detection circuit 60a. The CR motor controller 90a inputs the manipulated variable Ua to the motor driving circuit 30a, thereby making the motor driving circuit 30a drive the CR motor Ma with an amount of current or voltage corresponding to the manipulated variable Ua.

The LF motor controller 90b calculates a manipulated variable Ub for the LF motor Mb, based on the detected speed Vm and the detected position Xm of the conveyance roller 160 (the sheet P) inputted from the detection circuit 60b. The LF motor controller 90b inputs the manipulated variable Ub to the motor driving circuit 30b, thereby making the motor driving circuit 30b drive the LF motor Mb with an amount of current or voltage corresponding to the manipulated variable Ub.

Moreover, the PF motor controller 90c calculates a manipulated variable Uc for the PF motor Mc, based on the detected speed Vm and the detected position Xm of the sheet feeding roller 150 (the sheet P) inputted from the detection circuit 60c. The PF motor controller 90c inputs the manipulated variable Uc to the motor driving circuit 30c, thereby making the motor driving circuit 30c drive the PF motor Mc with an amount of current or voltage corresponding to the manipulated variable Uc.

Next, detailed constitutions of the CR motor controller 90*a* and the LF motor controller 90*b* will be explained. The CR motor controller 90*a* and the LF motor controller 90*b* may have a same constitution as each other. Thus, hereinafter, the CR motor controller 90*a* represents both the CR motor controller 90*a* and the LF motor controller 90*b*, and a constitution example of the CR motor controller 90*a* will be explained. Specifically, a first constitution example of the CR motor controller 90*a* is explained with reference to FIGS. 7A and 7B, and a second constitution example of the CR motor controller 90*a* is explained with reference to FIG. 8. Here, it may be possible to apply the first constitution example to one of the CR motor controller 90*a* and the LF motor controller 90*b*, and apply the second constitution example to the other.

<The First Constitution Example of the CR Motor Controller 90*a*>

Figure 7A:
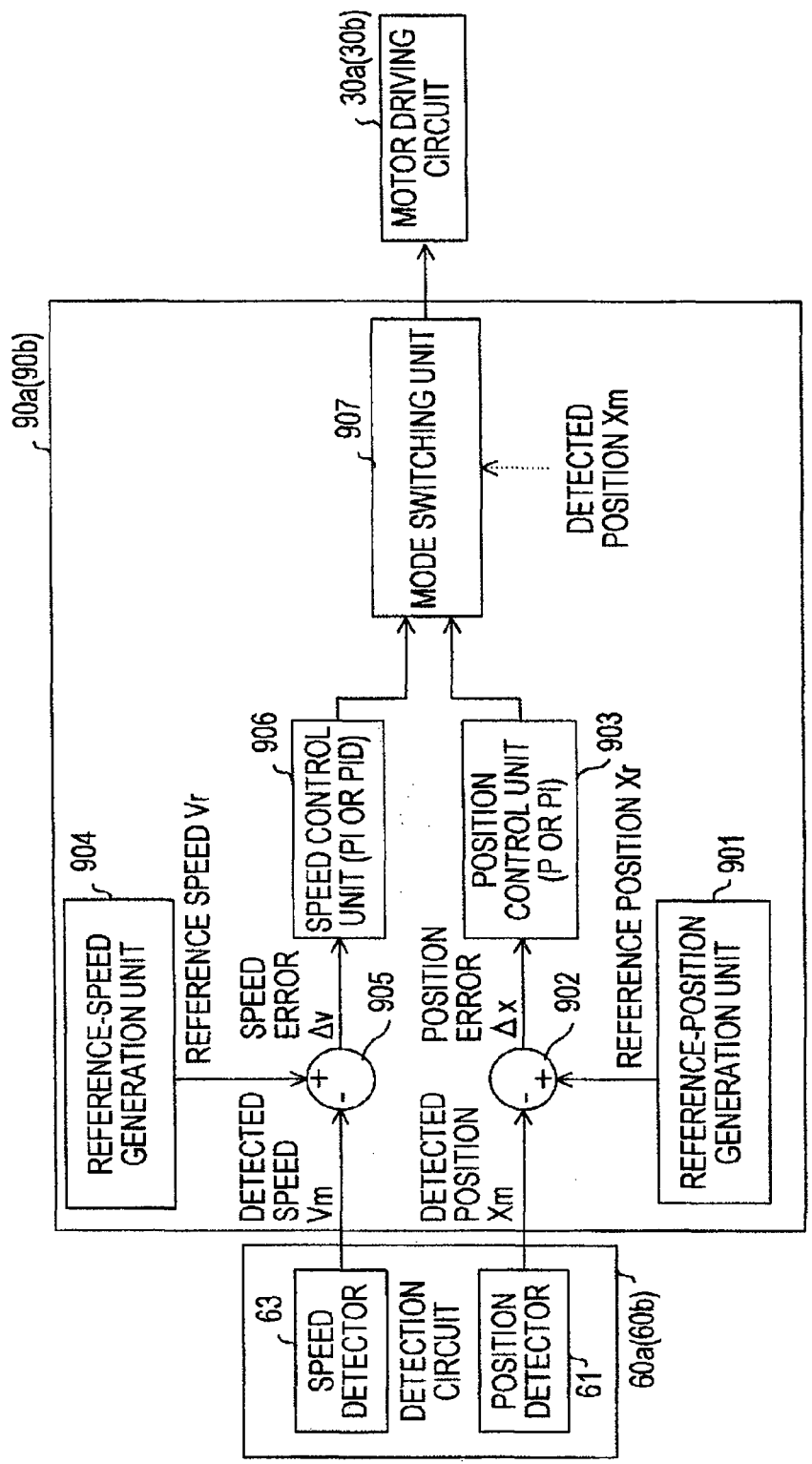
FIG. 7A is a block diagram illustrating a first constitution example of a motor controller.

As shown in FIG. 7A, the CR motor controller 90*a* according to the first constitution example is configured to switch between a position control and a speed control of an object. FIG. 7A is a block diagram showing the first constitution example of the CR motor controller 90*a*.

The CR motor controller 90*a* includes a reference-position generation unit 901, a position-error calculation unit 902, a position control unit 903, a reference-speed generation unit 904, a speed-error calculation unit 905, a speed control unit 906, and a mode switching unit 907.

The reference-position generation unit 901 generates data or a signal which represents a reference position Xr. The reference-speed generation unit 904 generates data or a signal which represents a reference speed Vr. The position-error calculation unit 902 calculates a position error $\Delta x = Xr - Xm$, which is an error between the detected position Xm inputted from the position detector 61*a* in the detection circuit 60*a*, and the reference position Xr in the form of the data or the signal inputted from the reference-position generation unit 901. The position-error calculation unit 902 inputs the position error to the position control unit 903. Based on the position error $\Delta x$ inputted from the position-error calculation unit 902, the position control unit 903 calculates a manipulated variable Uap corresponding to the position error $\Delta x$. The position control unit 903 inputs the manipulated variable Uap to the mode switching unit 907.

Specifically, the position control unit 903 calculates the manipulated variable Uap so as to be used to reduce the position error $\Delta x$ towards zero. The position control unit 903 may be constituted of a P controller (proportional controller) or a PI controller (proportional-integral controller). In this regard, although it may be possible to use a controller including a derivative element, such as a PID contoller (proportional-integral-derivative controller), it is preferable not to use the controller including the derivative element so that influence of interpolation can be suppressed.

The speed-error calculation unit 905 calculates a speed error $\Delta v = Vr - Vm$, which is an error between the detected speed Vm inputted from the speed detectors 631*a*, 632*a*, or 633*a* in the detection circuit 60*a*, and the reference speed Vr in the form of the data or the signal inputted from the reference-speed generation unit 904. FIGS. 7A and 8 show a speed detector 63 which represents each of the speed detectors 631*a*, 632*a*, and 633*a*. The speed-error calculation unit 905 inputs the speed error to the speed control unit 906. Based on the speed error $\Delta v$ inputted from the speed-error calculation unit 905, the speed control unit 906 calculates a manipulated variable Uav corresponding to the speed error $\Delta v$. The speed control unit 906 inputs the manipulated variable Uav to the mode switching unit 907. The speed control unit 906 calculates the manipulated variable Uav so as to be used to reduce the speed error $\Delta v$ towards zero. The speed control unit 906 may be constituted of a PI controller (proportional-integral controller) or a PID controller (proportional-integral-derivative controller).

Furthermore, the mode switching unit 907 selectively inputs, as the above-explained manipulated variable Ua, either one of the manipulated variable Uap inputted from the position control unit 903 and the manipulated variable Uav inputted from the speed control unit 906, to the motor driving circuit 30*a*.

Specifically, the CR motor controller 90*a* calculates the manipulated variable Uav and the manipulated variable Uap, respectively, based on the detected speed Vm and the detected position Xm, both of which are inputted from the detection circuit 60*a*. Before the carriage 120 reaches a predetermined distance short of the return point, the CR motor controller 90*a* inputs, as the manipulated variable Ua, the manipulated variable Uav calculated by the speed control unit 906 to the motor driving circuits 30*a*. On the other hand, after the carriage 120 has reached the predetermined distance short of the return point, the CR motor controller 90*a* inputs, as the manipulated variable Ua, the manipulated variable Uap calculated by the position control unit 903 to the motor driving circuits 30*a*. As above, before the carriage 120 reaches the predetermined distance short of the return point, the CR motor controller 90*a* controls the speed of the carriage 120 based on the above-explained detected speed Vm obtained by using at least one of the digital A-phase signal and the digital B-phase signal, or the digital Z-phase signal. After the carriage 120 reaches the predetermined distance short of the return point, the CR motor controller 90*a* controls the position of the carriage 120 based on the detected position Xm obtained by using the interpolated A-phase digital signal and the interpolated B-phase digital signal. Thereby, the carriage 120 is made to accurately stop at the return point.

The first constitution example of the CR motor controller 90*a* has been explained as above. If the first constitution example is applied to the LF motor controller 90*b*, the LF motor controller 90*b* may be constituted as below. That is, the LF motor controller 90*b* calculates a manipulated variable Ubv and a manipulated variable Ubp, respectively, based on the detected speed Vm and the detected position Xm, both of which are inputted from the detection circuit 60*b*. Before a conveyance amount of a sheet conveyed by the conveyance roller 160 reaches a predetermined distance D, the LF motor controller 90*b* inputs, as the above-explained manipulated variable Ub, the manipulated variable Ubv calculated by the speed control unit 906 to the motor driving circuit 30*b*. On the other hand, after the conveyance amount of the sheet conveyed by the conveyance roller 160 has reached the predetermined distance D, the LF motor controller 90*b* inputs, as the manipulated variable Ub, the manipulated variable Ubp calculated by the position control unit 903 to the motor driving circuit 30*b*. The LF motor controller 90*b* is configured to convey the sheet P each time by predetermined numbers of lines via the conveyance roller 160. Therefore, in this case, the distance D may be set as a distance slightly shorter than a distance D0 corresponds to a conveyance amount of the sheet P at one time.

The upper graph in FIG. 7B is a graph showing one example of a trajectory of the reference speed Vr which can be applied to the CR motor controller 90*a* and the LF motor controller 90*b*. The bottom graph in FIG. 7B is a graph showing one example of a trajectory of the reference position Xr which can be applied to the CR motor controller 90*a* and the LF motor controller 90*b*.

<The Second Constitution Example of the CR Motor Controller 90a>

Next, the second constitution example of the CR motor controller 90a will be explained. As shown in FIG. 8, the CR motor controller 90a according to the second constitution example includes a speed control system as a minor loop and a position control system as a major loop. The CR motor control unit 90a includes a reference-position generation unit 911, a position-error calculation unit 912, a position control unit 913, a speed-error calculation unit 914, and a speed control unit 915.

The reference-position generation unit 911 generates data or a signal which represents the reference position Xr. The position-error calculation unit 912 calculates a position error $\Delta x = Xr - Xm$, which is an error between the detected position Xm inputted from the position detector 61a in the detection circuit 60a, and the reference position Xr in the form of the data or the signal inputted from the reference-position generation unit 911. The position-error calculation unit 912 inputs the position error to the position control unit 913.

Based on the position error $\Delta x$ inputted from the position-error calculation unit 912, the position control unit 913 calculates a reference speed Vr corresponding to the position error $\Delta x$, and inputs the reference speed Vr to the speed-error calculation unit 914. The position control unit 913 may be constituted of a P controller (proportional controller) or a PI controller (proportional-integral controller). In this regard, as in the first constitution example, although it may be possible to use a controller including a derivative element, such as a PID contoller, it is preferable not to use the controller including the derivative element so that influence of interpolation can be suppressed.

The speed-error calculation unit 914 calculates a speed error $\Delta v = Vr - Vm$, which is an error between the detected speed Vm inputted from the speed detector 63 (i.e., the speed detectors 631a, 632a, or 633a) in the detection circuit 60a, and the reference speed Vr inputted from the position control unit 913. The speed-error calculation unit 914 inputs the speed error to the speed control unit 915. Based on the speed error $\Delta v$ inputted from the speed-error calculation unit 914, the speed control unit 915 calculates a manipulated variable Uas corresponding to the speed error $\Delta v$. The speed control unit 915 inputs the manipulated variable Uas, as the manipulated variable Ua, to the motor driving circuit 30a. The speed control unit 915 calculates the manipulated variable Uas so as to be used to reduce the speed error $\Delta v$ towards zero. The speed control unit 915 may be constituted of a PI controller (proportional-integral controller) or a PID controller (proportional-integral-derivative controller).

In a manner as explained above, the CR motor controller 90a calculates the manipulated variable Uas based on the detected position Xm and the detected speed Vm, both of which are inputted from the detection circuit 60a. The CR motor controller 90a inputs the manipulated variable Uas, as the manipulated variable Ua, to the motor driving circuits 30a, thereby controlling the CR motor Ma to control conveyance of the carriage 120.

The second constitution example of the CR motor controller 90a has been explained as above. If the second constitution example is applied to the LF motor controller 90b, the LF motor controller 90b may be constituted as below. That is, the LF motor controller 90b calculates a manipulated variable Ubs in the above explained manner, based on the detected position Xm and the detected speed Vm, both of which are inputted from the detection circuit 60b. The LF motor controller 90b inputs the manipulated variable Ubs, as the manipulated variable Ub, to the motor driving circuit 30b, thereby controlling the LF motor Mb to control a sheet conveyance of the conveyance roller 160.

As above, the CR motor controller 90a and the LF motor controller 90b have been explained. According to the CR motor controller 90a and the LF motor controller 90b constituted as above, it becomes possible to realize a highly accurate position control and a highly accurate speed control by utilizing the analog encoder 40 having a low resolution capability.

That is, when output signals of the analog encoder 40 are interpolated, distortion in the output signals occurs. However, a position detection is performed by a detection method in which rising edges of the signals are detected and a value of the position counter is incremented or decremented. Therefore, an effect of improving a position resolution capability is greater than an influence of position detection errors. On the other hand, in a speed detection, a time interval between the signal edges is measured. Therefore, if the speed is detected based on the interpolated A-phase digital signal and/or the interpolated B-phase digital signal, detection errors in the speed detection due to distortion in the signals caused by fractions, etc. of the resistors R1 to R8, greatly affect the speed control. For this reason, in the present embodiment, the speed detection is performed by using at least one of the non-interpolated A-phase digital signal and the non-interpolated B-phase digital signal, or the Z-phase digital signal, since edges of these signals are specified by a constitution of the encoder. Therefore, according to the present embodiment, it is possible to inhibit accuracy of the speed detection from deteriorating when the output signals of the encoder are interpolated. Thus, it becomes possible to achieve both of a highly accurate position control and a highly accurate speed control.

Features of the printer apparatus 1 of the present embodiment are in the position detection and the speed detection. Thus, the constitutions of the CR motor controller 90a and LF motor controller 90b should not be limited to the first and second constitution examples. Moreover, the PF motor controller 90c may be configured to have the same constitution as those of the CR motor controller 90a and the LF motor controller 90b, and also may be constituted of other known speed control systems or position control systems. In view of the above, a detailed explanation of the PF motor controller 90c will not be given here.

As explained above, the present embodiment makes it possible to inhibit an accuracy of the speed detection from degrading due to the interpolation of the encoder signals. Thus, it is possible to perform a position detection and a speed detection more appropriately than in a conventional manner. Consequently, according to the printer apparatus 1, a highly accurate conveyance of a sheet can be achieved, and furthermore, a highly accurate conveyance of the inkjet head 110 can be achieved. As a result, it becomes possible to form a high-quality image onto the sheet.

<Explanation of Correspondence>

The constitutions of the printer apparatus 1 has been explained as above. Next, correspondence between terms will be explained. The comparators 511-518 and the XOR circuits 521-624, 631, and 632 included in the signal processing circuit 50 correspond to one example of a signal generation unit. The position detector 61 included in the detection circuits 60a, 60b, and 60c correspond to one example of a position detection unit. The speed detector 63 included in the detection circuits 60a, 60b, and 60c correspond to one example of a speed detection unit.

Moreover, a process realized by the XOR circuit 540 which generates the Z-phase digital signal having edges corresponding to edges of the digitized encoder signals, based on the A-phase digital signal and the B-phase digital signal, correspond to one example of a process of the present invention in which the speed detection unit generates a speed detection signal.

Further, the CR motor controller 90a, the LF motor controller 90b, and the PF motor controller 90c correspond to one example of a drive control unit. The position-error calculation unit 902 and the position control unit 903, or the position-error calculation unit 912 and the position control unit 913 correspond to one example of a position control unit. The speed-error calculation unit 905 and the speed control unit 906, or the speed-error calculation unit 914 and the speed control unit 915 correspond to one example of a speed control unit.

The present invention should not be limited to the above embodiment, and can adopt various constitutions. For example, in the above embodiment, an example in which the present invention is applied to conveyance of a sheet or the inkjet head 110 in the printer apparatus 1, is explained. However, the present invention may be applied to conveyance of an image reading unit in an image reading apparatus.

Moreover, in the above embodiment, the A-phase analog signal and the B-phase analog signal are interpolated by four. However, the A-phase analog signal and the B-phase analog signal may be interpolated by a number larger than four (e.g., interpolated by eight) to generate an interpolated A-phase digital signal and an interpolated B-phase digital signal digitized in the signal processing circuit 50. Furthermore, the position control units 903 and 913 may be constituted of an I controller (integral controller). The speed control units 906 and 915 may be constituted of a P controller (proportional controller).

Further, if, for example, the analog encoder 40 is configured to separately input a signal indicating a moving (rotating) direction of an object to the position detector 61, it is not necessary to input both of the interpolated A-phase digital signal and the interpolated B-phase digital signal to the position detector 61; in this case, only one of the above two signals may be inputted. Also, the position detector 61 may be configured to renew the value of the position counter by using the interpolated A-phase digital signal and the interpolated B-phase digital signal, each time a rising edge and a falling edge of each of the above signals are detected as in a known technique. Moreover, the analog encoder 40 may include a further light receiving unit.

In a case of a system where an object moves only in one direction without moving back, it is not necessary to detect a moving direction. Thus, in this case, the analog encoder 40 may include only one of the light receiving units 46 and 47. For example, the following constitution may be possible: the analog encoder 40 includes the light receiving unit 46; the signal processing circuit 50 generates a non-interpolated A-phase digital signal and the interpolated A-phase digital signal, based on the A-phase analog signal inputted from the analog encoder 40; and the signal processing circuit 50 only inputs the A-phase digital signal to the speed detection unit, and only inputs the interpolated A-phase digital signal to the position detection unit. In this case, the first constitution example (see, FIG. 6A) may be applied to the detection circuit 60. That is, in the speed detector 631, the speed of the object is detected based on the non-interpolated A-phase digital signal inputted from the signal processing circuit 50. In the position detector 61, each time a rising edge of the interpolated A-phase digital signal is detected based on the interpolated A-phase digital signal inputted from the analog encoder 40, the value of the position counter is incremented by one. Thereby, the position of the object is detected.

<Modified Embodiment>

Figure 10:
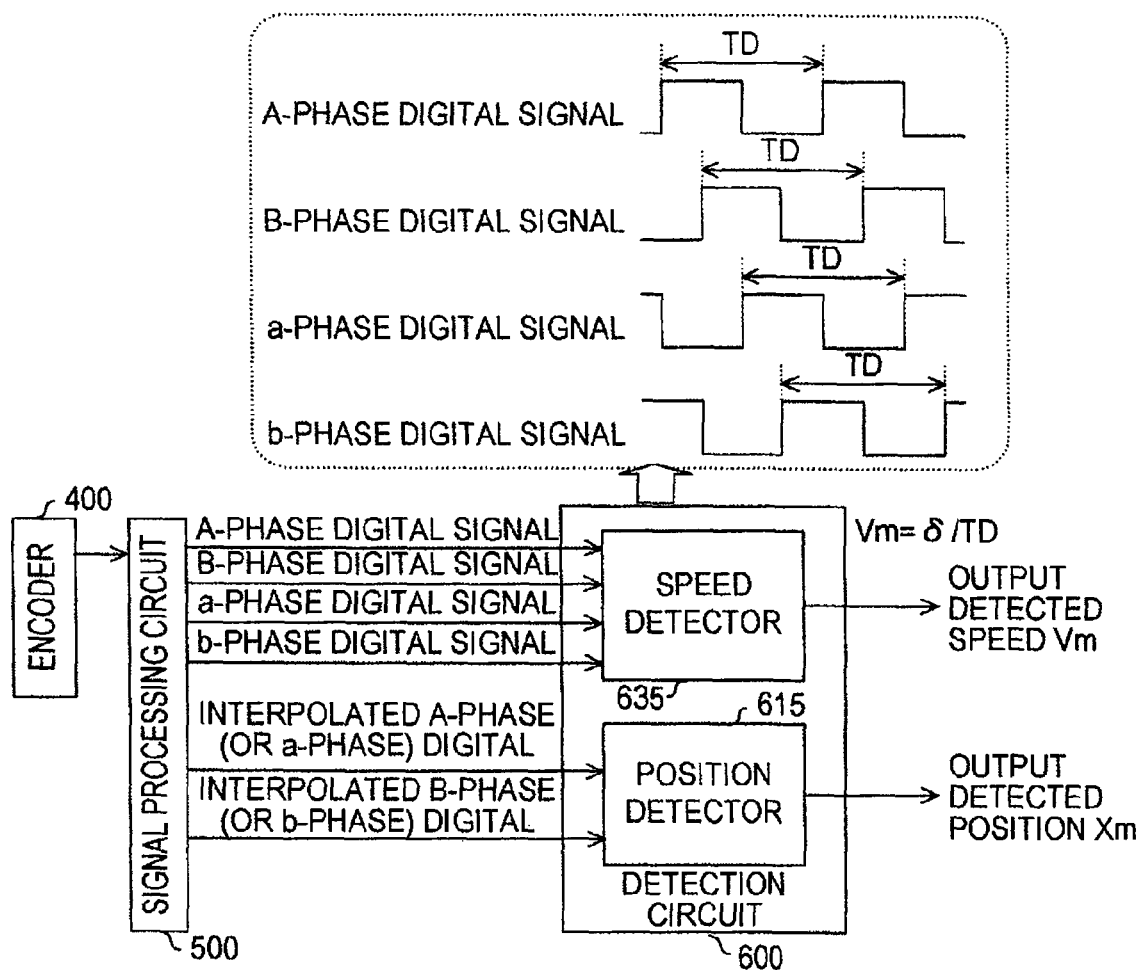
FIG. 10 is a block diagram showing a constitution of a detection circuit according to the modified embodiment.

Next, a modified embodiment of the present invention will be explained. A printer apparatus 1 according to the modified embodiment includes: an analog encoder 400 shown in FIG. 9, instead of the analog encoder 40 (each of the analog encoders 40a, 40b, and 40c) of the above embodiment; a signal processing circuit 500 shown in FIG. 9, instead of the signal processing circuit 50 (each of the signal processing circuits 50a, 50b, and 50c) of the above embodiment; a detection circuit 600 shown in FIG. 10, instead of the detection circuit 60 (the detection circuits 60a, 60b, and 60c) of the above embodiment. Except for the above-mentioned portions, other portions of the modified embodiment are the same as those in the above embodiment. Thus, hereinafter, constitutions of the analog encoder 400, the signal processing circuit 500, and the detection circuit 600 are selectively explained, and the same portions as in the above embodiment will not be explained.

As shown in FIG. 9, the analog encoder 400 includes an encoder scale 41 and a sensor body 440. The sensor body 440 is constituted of a light emitting unit 45 and four light receiving units 46, 47, 48 and 49. In the same manner as the analog encoder 40, the light receiving unit 47 is arranged having a distance, which corresponds to phase $-\pi/2$, from the light receiving unit 46. The light receiving unit. 48 is arranged having a distance, which corresponds to phase $-\pi/2$, from the light receiving unit 47. The light receiving unit 49 is arranged having a distance, which corresponds to phase $-\pi/2$, from the light receiving unit 48.

In the analog encoder 400, each of the light receiving units 46, 47, 48 and 49 outputs, as an encoder signal, a light receiving signal (sine wave) which has a different phase by $\pi/2$ from one another. Hereinafter, an encoder signal outputted from the light receiving unit 46 is referred to as an A-phase analog signal. An encoder signal outputted from the light receiving unit 47 is referred to as a B-phase analog signal. An encoder signal outputted from the light receiving unit 48 is referred to as an a-phase analog signal. An encoder signal outputted from the light receiving unit 49 is referred to as a b-phase analog signal. These encoder signals are inputted to the signal processing circuit 500.

As shown in FIG. 9, the signal processing circuit 500 includes two of the signal processing circuit 50 explained in the above embodiment. The A-phase analog signal and the B-phase analog signal outputted from the analog encoder 400 are inputted to a first signal processing circuit 60 included in the signal processing circuit 500. The a-phase analog signal and the b-phase analog signal are inputted to a second signal processing circuit 50 included in the signal processing circuit 500.

In the first signal processing circuit 60, the A-phase analog signal is, in the same way as in the above embodiment, converted to a non-interpolated A-phase digital signal and to an interpolated A-phase digital signal which is an interpolated encoder signal, and then outputted. The B-phase analog signal is converted to a non-interpolated B-phase digital signal and to an interpolated B-phase digital signal which is an interpolated encoder signal, and then outputted. Similarly, in the second signal processing circuit 50, the a-phase analog signal is converted to a non-interpolated a-phase digital signal which is a signal having a phase difference of $\pi$ from the A-phase digital signal, and to an interpolated a-phase digital signal which is a signal having a phase difference of it from the interpolated. A-phase digital signal, and then outputted. The b-phase analog signal is converted to a non-interpolated b-phase digital signal which is a signal having a phase difference of $\pi$ from the B-phase digital signal, and to an interpolated b-phase digital signal which is a signal having a phase difference of π from the interpolated B-phase digital signal, and then outputted.

That is, the second signal processing circuit 50 performs the same process as that in the first signal processing circuit 50 to the a-phase analog signal which is inputted instead of the A-phase analog signal, and outputs the a-phase digital signal and the interpolated a-phase digital signal. Also, the second signal processing circuit 50 performs the same process as that in the first signal processing circuit 50 to the b-phase analog signal which is inputted instead of the B-phase analog signal, and outputs the b-phase digital signal and the interpolated b-phase digital signal. Since the Z-phase digital signal is not used in the modified embodiment, explanations of the Z-phase digital signal are omitted. However, the signal processing circuit 500 may be configured to output the Z-phase digital signal.

The detection circuit 600 which detects a position and a speed of an object based on signals outputted from the signal processing circuit 500 includes a position detector 615 and a speed detector 635. The position detector 615 detects the position of the object based on the interpolated A-phase digital signal and the interpolated B-phase digital signal. The speed detector 635 detects the speed of the object based on the A-phase digital signal, the B-phase digital signal, the a-phase digital signal, and the b-phase digital signal.

The position detector 615 detects the position in the same manner as in the position detector 61 of the above embodiment, and outputs detection results (detected position Xm). It may be possible to input the interpolated a-phase digital signal and the interpolated b-phase digital signal, instead of the interpolated A-phase digital signal and the interpolated B-phase digital signal, to the position detector 615.

The speed detector 635 includes following functions: measuring an input time interval TD of a rising edge of the A-phase digital signal; measuring an input time interval TD of a rising edge of the B-phase digital signal; measuring an input time interval TD of a rising edge of the a-phase digital signal; and measuring an input time interval TD of a rising edge of the b-phase digital signal. The speed detector 635 detects (calculates) the speed of the object by using a latest measured value of the input time intervals TD measured by the above functions.

Specifically, based on the expression Vm=δ/TD, the speed detector 635 detects (calculates) the speed of the object by using a latest measured value of the above-measured input time intervals TD, and outputs the detected speed Vm. In the expression, "δ" is a distance corresponding to one cycle of each of the A-phase digital signal, the B-phase digital signal, the a-phase digital signal, and the b-phase digital signal.

According to the above-constituted printer apparatus 1 of the modified embodiment, it is possible to appropriately obtain detected values of the position and the speed. Therefore, a highly accurate position control and speed control can be achieved.

In the printer apparatus 1 of the modified embodiment, it may be configured that the interpolated A-phase digital signal, the interpolated B-phase digital signal, the interpolated a-phase digital signal, and the interpolated b-phase digital signal are inputted to the position detector 615. Each time a rising edge (or, a falling edge) of each of the interpolated A-phase digital signal, the interpolated B-phase digital signal, the interpolated a-phase digital signal, and the interpolated b-phase digital signal are detected, a value of the position counter included inside the position detector 615, may be renewed (i.e., incremented or decremented depending on a processing direction), thereby detecting the position. The speed detector 635 may detect the speed, in the manner same as shown in FIG. 6C, using only the A-phase digital signal and the B-phase digital signal, without using the a-phase digital signal and the b-phase digital signal. Alternatively, in this case, the speed detector 635 may detect the speed, in the manner same as shown in FIG. 6C, using only the a-phase digital signal and the b-phase digital signal, without using the A-phase digital signal and the B-phase digital signal.

The modified embodiment has been explained as above. In addition, the analog encoder 400 may include further more light receiving units. Further, the analog encoder 400 may perform detection of the position and the speed of the object in a following manner: a A-phase analog signal is converted to a signal (differential signal) having amplitude twice amplitude of the A-phase analog signal in such a manner that the A-phase analog signal is deducted by a negative-a-phase analog signal; a B-phase analog signal is converted to a signal (differential signal) having amplitude twice amplitude of the B-phase analog signal in such a manner that the B-phase analog signal is deducted by a negative-b-phase analog signal; by using the above converted A-phase analog signal and converted B-phase analog signal, the position and the speed of the object may be detected.

What is claimed is:

1. A drive control device for performing drive control of an object, the drive control device comprising:
   a signal processing circuit configured to generate at least one non-interpolated digital encoder signal and at least one interpolated digital encoder signal,
      wherein generation of the at least one non-interpolated digital encoder signal and the at least one interpolated digital encoder signal is based on at least one light receiving signal inputted from at least one light receiving unit of an encoder,
      wherein the at least one non-interpolated digital encoder signal is generated by digitizing the at least one light receiving signal,
      wherein the at least one interpolated digital encoder signal is generated by digitizing and interpolating the at least one light receiving signal; and
      wherein the signal processing circuit outputs the at least one non- interpolated digital encoder signal and the at least one interpolated digital encoder signal;
   a position detection unit configured to detect a position of the object based on the at least one interpolated digital encoder signal inputted from the signal processing circuit;
   a speed detection unit configured to detect a speed of the object based on the at least one non-interpolated digital encoder signal inputted from the signal processing circuit; and
   a drive control unit configured to perform the drive control of the object based on the position detected by the position detection unit and the speed detected by the speed detection unit.

2. The drive control device according to claim 1,
   wherein the encoder includes a plurality of light receiving units;
   wherein the at least one light receiving signal which is inputted to the signal processing circuit includes light receiving signals inputted from the plurality of light receiving units; and
   wherein the signal processing circuit is configured to generate the at least one interpolated digital encoder signal and the at least one non-interpolated digital encoder signal, based on the light receiving signals.

3. The drive control device according to claim 1,
wherein the encoder includes a plurality of light receiving units;
wherein the plurality of light receiving units are configured to input, to the signal processing circuit, a plurality of light receiving signals, each of the light receiving signals having a different phase from another signal of the light receiving signals;
wherein the signal processing circuit is configured to generate a plurality of interpolated digital encoder signals by digitizing and interpolating the light receiving signals, the interpolated digital encoder signals corresponding to the plurality of light receiving units;
wherein the at least one non-interpolated digital encoder signal is:
   a single non-interpolated digital encoder signal generated by the signal processing circuit that digitizes the light receiving signal inputted from a specific light receiving unit among the light receiving signals inputted from the plurality of light receiving units so as to generate the single non-interpolated digital encoder signal, or
   non-interpolated digital encoder signals generated by the signal processing circuit that digitizes the light receiving signals inputted from the light receiving units belonging to a specific group of the light receiving units among the light receiving signals inputted from the plurality of light receiving units so as to generate the non-interpolated digital encoder signals, the non-interpolated digital encoder signals corresponding to the light receiving units belonging to the specific group of the light receiving units;
wherein the position detection unit is configured to detect the position of the object based on the interpolated digital encoder signals inputted from the signal processing circuit; and
wherein the speed detection unit is configured to detect the speed of the object based on the single non-interpolated digital encoder signal inputted from the signal processing circuit, or the non-interpolated digital encoder signals inputted from the signal processing circuit.

4. The drive control device according to claim 1,
wherein the encoder includes a plurality of light receiving units;
wherein the plurality of light receiving units are configured to input, to the signal processing circuit, a plurality of light receiving signals, each of the light receiving signals having a different phase from a different signal included in the light receiving signals;
wherein the signal processing circuit is configured to generate a plurality of interpolated digital encoder signals by digitizing and interpolating the light receiving signals inputted from the plurality of light receiving units, the interpolated digital encoder signals corresponding to the plurality of light receiving units;
wherein the signal processing circuit is configured to generate a plurality of non-interpolated digital encoder signals by digitizing the light receiving signals inputted from the plurality of light receiving units, the non-interpolated digital encoder signals corresponding to the plurality of light receiving units;
wherein the position detection unit is configured to detect the position of the object based on the interpolated digital encoder signals inputted from the signal processing circuit; and
wherein the speed detection unit is configured to detect the speed of the object based on the non-interpolated digital encoder signals inputted from the signal processing circuit.

5. The drive control device according to claim 1,
wherein the encoder includes a plurality of light receiving units;
wherein the plurality of light receiving units are configured to input, to the signal processing circuit, a plurality of light receiving signals, each of the light receiving signals having a different phase from a different signal included in the light receiving signals;
wherein the at least one interpolated digital encoder signal is:
   interpolated digital encoder signals generated by the signal processing circuit that digitizes and interpolates the light receiving signals inputted from the light receiving units belonging to a specific group of the light receiving units among the light receiving signals inputted from the plurality of light receiving units so as to generate the interpolated digital encoder signals, the interpolated digital encoder signals corresponding to the light receiving units belonging to the specific group of the light receiving units, or
   a single interpolated digital encoder signal generated by the signal processing circuit that digitizes and interpolates the light receiving signal inputted from a specific light receiving unit among the light receiving signals inputted from the plurality of light receiving units so as to generate the single interpolated digital encoder signal;
wherein the signal processing circuit is configured to generate a plurality of non-interpolated digital encoder signals by digitizing the light receiving signals inputted from the plurality of light receiving units, the non-interpolated digital encoder signals corresponding to the plurality of light receiving units;
wherein the position detection unit is configured to detect the position of the object based on the interpolated digital encoder signals inputted from the signal processing circuit, or the single interpolated digital encoder signal inputted from the signal processing circuit; and
wherein the speed detection unit is configured to detect the speed of the object based on the non-interpolated digital encoder signals inputted from the signal processing circuit.

6. The drive control device according to claim 1,
wherein the encoder includes a plurality of light receiving units;
wherein the plurality of light receiving units are configured to input, to the signal processing circuit, a plurality of light receiving signals, each of the light receiving signals having a different phase from a different signal included in the light receiving signals;
wherein the signal processing circuit is configured to generate a plurality of non-interpolated digital encoder signals by digitizing the light receiving signals inputted from the plurality of light receiving units, the non-interpolated digital encoder signals corresponding to the plurality of light receiving units; and
wherein the speed detection unit is configured to generate, based on the non-interpolated digital encoder signals inputted from the signal processing circuit, a speed detection signal that has edges corresponding to edges appeared on the non-interpolated digital encoder signals, and detects the speed of the object based on the speed detection signal.

7. The drive control device according to claim 1,
wherein the drive control unit includes:
- a position control unit configured to determine a manipulated variable based on the position detected by the position detection unit and a predetermined reference position, thereby controlling the position of the object to the reference position, and
- a speed control unit configured to determine a manipulated variable based on the speed detected by the speed detection unit and a predetermined reference speed, thereby controlling the speed of the object to the reference speed; and
- wherein the drive control unit is configured to perform the drive control of the object by switching between use of the position control unit and used of the speed control unit.

8. The drive control device according to claim 1, wherein the drive control unit includes:
- a position control unit configured to set a reference speed of the object based on the position detected by the position detection unit and a predetermined reference position, and
- a speed control unit configured to determine a manipulated variable based on the speed detected by the speed detection unit and the reference speed set by the position control unit, thereby controlling the speed of the object to the reference speed.

9. The drive control device according to claim 7,
wherein the position control unit is configured to determine the manipulated variable by performing proportional control (P control), integral control (I control), or proportional-integral control (PI control) based on an error between the position detected by the position detection unit and the reference position, thereby controlling the position of the object to the reference position.

10. The drive control device according to claim 8,
wherein the position control unit is configured to set the reference speed corresponding to an error between the position detected by the position detection unit and the reference position by performing a proportional operation (P operation), an integral operation (I operation), or a proportional-integral operation (PI operation).

11. The drive control device according to claim 1,
wherein the object is a conveyance roller included in a conveyance device configured to convey a sheet by rotation of the conveyance roller; and
wherein the drive control unit is configured to control conveyance of the sheet by performing a rotation control of the conveyance roller based on a rotation position of the conveyance roller detected by the position detection unit and a rotation speed of the conveyance roller detected by the speed detection unit.

12. The drive control device according to claim 11,
wherein the conveyance device having the conveyance roller as the object is included within an image forming apparatus and conveys the sheet, by rotating the conveyance roller, to an image forming position at which an image forming unit forms an image.

13. The drive control device according to claim 1,
wherein the object is a recording head provided in an image forming apparatus that conveys the recording head to form an image onto a sheet; and
wherein the drive control unit is configured to control conveyance of the recording head based on a position of the recording head detected by the position detection unit and a speed of the recording head detected by the speed detection unit.

14. The drive control device according to claim 13,
wherein the recording head as the object is an inkjet head that ejects ink droplets.

15. The drive control device according to claim 1,
wherein the encoder includes a light emitting unit and an encoder scale, and
wherein the at least one light receiving unit receives output lights outputted from the light emitting unit via the encoder scale.

16. A drive control method to perform a drive control of an object, the drive control method comprising:
- a signal generation step of generating at least one non-interpolated digital encoder signal and at least one interpolated digital encoder signal,
    - wherein generation of the at least one non-interpolated digital encoder signal and the at least one interpolated digital encoder signal is based on at least one light receiving signal inputted from the at least one light receiving unit of an encoder,
    - wherein the at least one non-interpolated digital encoder signal is generated by digitizing the at least one light receiving signal, and
    - wherein the at least one interpolated digital encoder signal is generated by digitizing and interpolating the at least one light receiving signal;
- a position detection step of detecting a position of the object based on the at least one interpolated digital encoder signal generated in the signal generation step;
- a speed detection step of detecting a speed of the object based on the at least one non-interpolated digital encoder signal generated in the signal generation step; and
- a drive control step of performing the drive control of the object based on the position detected in the position detection step and the speed detected in the speed detection step.

17. The drive control method according to claim 16,
wherein the encoder includes a plurality of light receiving units;
wherein the plurality of light receiving units are configured to input a plurality of light receiving signals; and
wherein the signal generation step includes generating the at least one interpolated digital encoder signal and the at least one non-interpolated digital encoder signal, based on the light receiving signals.

18. The drive control device according to claim 1, wherein the at least one interpolated digital encoder signal includes at least one multiplied digital encoder signal.

19. The drive control device according to claim 1, wherein the at least one interpolated digital encoder signal has a higher frequency than the at least one non-interpolated digital encoder signal.

20. The drive control method according to claim 16, wherein the at least one interpolated digital encoder signal includes at least one multiplied digital encoder signal.

21. The drive control method according to claim 16, wherein the at least one interpolated digital encoder signal has a higher frequency than the at least one non-interpolated digital encoder signal.

* * * * *